United States Patent
Beckman et al.

(10) Patent No.: US 10,407,167 B1
(45) Date of Patent: Sep. 10, 2019

(54) DUCTS WITH AIRFLOW CHANNELS

(71) Applicant: Amazon Technologies, Inc., Seattle, WA (US)

(72) Inventors: Brian C. Beckman, Newcastle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/782,787

(22) Filed: Oct. 12, 2017

Related U.S. Application Data

(63) Continuation of application No. 14/975,548, filed on Dec. 18, 2015, now Pat. No. 9,809,304.

(51) Int. Cl.
  *B64C 39/06* (2006.01)
  *B64C 27/20* (2006.01)
  *B64C 39/02* (2006.01)

(52) U.S. Cl.
  CPC ............ *B64C 27/20* (2013.01); *B64C 39/024* (2013.01); *B64C 39/064* (2013.01); *B64C 2201/108* (2013.01); *B64C 2201/162* (2013.01)

(58) Field of Classification Search
  CPC ............................ B64C 11/001; B64C 11/005
  See application file for complete search history.

(56) References Cited

U.S. PATENT DOCUMENTS

| | | | | |
|---|---|---|---|---|
| 1,798,141 | A * | 3/1931 | Chillingworth | B64C 11/001 244/15 |
| 1,873,505 | A * | 8/1932 | Stipa | B64C 11/001 244/15 |
| 3,101,917 | A * | 8/1963 | Sudrow | B64C 11/001 244/23 C |
| 4,461,436 | A * | 7/1984 | Messina | B64C 27/20 244/23 C |
| 9,809,304 | B1 * | 11/2017 | Beckman | B64C 39/024 |
| 2003/0052222 | A1 * | 3/2003 | Plump | B64C 29/02 244/23 A |
| 2006/0076456 | A1 * | 4/2006 | Layton | B64C 11/001 244/53 B |
| 2007/0274836 | A1 * | 11/2007 | Sanchez | B63H 1/12 416/237 |
| 2010/0025540 | A1 | 2/2010 | Castoldi | |
| 2011/0001017 | A1 * | 1/2011 | Burdisso | B64C 39/024 244/23 A |
| 2013/0068882 | A1 | 3/2013 | Dumas et al. | |

* cited by examiner

Primary Examiner — Brian M O'Hara
(74) Attorney, Agent, or Firm — Athorus, PLLC

(57) ABSTRACT

This disclosure describes a configuration of an aerial vehicle, such as an unmanned aerial vehicle, in which one or more of the propellers are positioned within a duct that includes an active airflow channel within the interior of the duct. The active airflow channel actively moves within the duct so that it remains aligned with the tips of the blades of the propeller within the duct. As the propeller and the active airflow channel rotate, at least some of the airflow structures (e.g., vortices) shed from the blades of the propeller are collected by the active airflow channel and channeled away from the propeller so that a following blade of the propeller does not pass through the collected airflow structures.

17 Claims, 14 Drawing Sheets

DUCTS WITH AIRFLOW CHANNELS

PRIORITY CLAIM

This application is a continuation of U.S. patent application Ser. No. 14/975,548, filed Dec. 18, 2015 and titled "Aerial Vehicle Propeller Ducts With Active Airflow Channels," which are herein incorporated by referenced in their entirety.

BACKGROUND

Multi-propeller aerial vehicles (e.g., quad-copters, octo-copters) are becoming more common. Such vehicles are aerially maneuvered and navigated by altering the lifting force generated by the different propellers. While agile, as more propellers are added, the sound generated by the aerial vehicle increases. Likewise, exposed propellers present hazards to objects around the multi-propeller aerial vehicle.

BRIEF DESCRIPTION OF THE DRAWINGS

The detailed description is set forth with reference to the accompanying figures. In the figures, the left-most digit(s) of a reference number identifies the figure in which the reference number appears.

Figure 1:
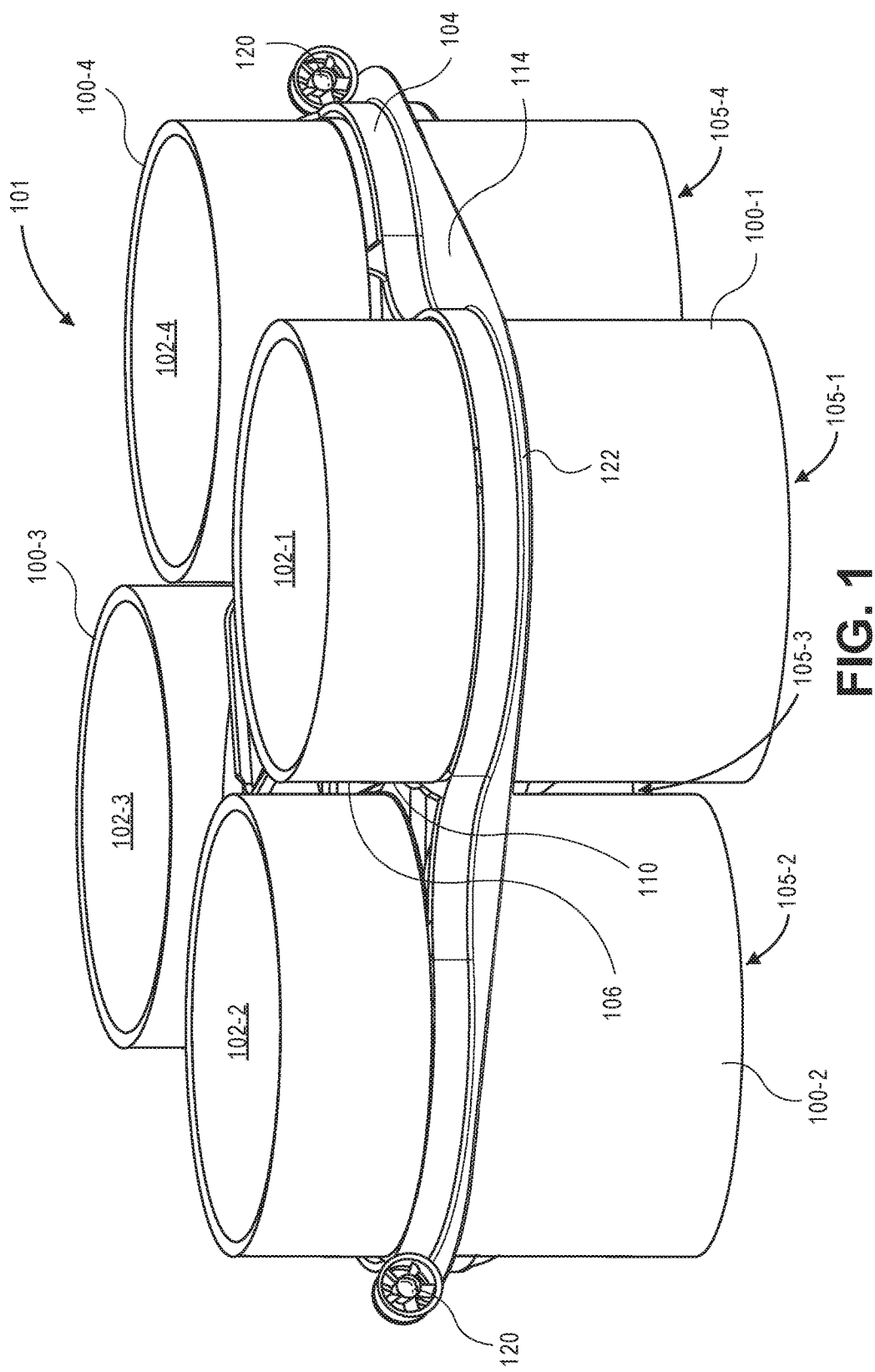
FIG. 1 depicts a diagram of an aerial vehicle with ducted propellers, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" components.

DETAILED DESCRIPTION

This disclosure describes a configuration of an aerial vehicle, such as an unmanned aerial vehicle ("UAV"), that includes ducts with active airflow channels positioned around each propeller of the aerial vehicle. The inner surface of the ducts are configured to generate airflow channels that collect vortices, wakes, and/or other airflow structures (collectively referred to herein as "airflow structures") shed from the propeller blades, channel the collected airflow structures away from the propeller and out of the duct. By channeling collected airflow structures away from the propeller, the sound generated by those airflow structures and/or the sound generated by a following propeller blade passing through those airflow structures, if they are not channeled away from the propeller, is reduced. For example, by channeling the vortices away from the propeller, blade-vortex interaction ("BVI"), and the resulting sound, is reduced because the following blade of the propeller does not pass by or through the shed vortices of a leading blade of the propeller. Similarly, by channeling wake flows away from the propeller, blade-wake interaction ("BWI") and the resulting sound, is reduced because the following blade of the propeller does not pass by or through the wake of a leading blade of the propeller. In a similar manner, interactions between a following blade of a propeller and other airflow structures shed from a leading blade of the propeller may likewise generate sounds if the shed airflow structures are not channeled away from the propeller.

Interaction between a following blade of a propeller and airflow structures shed from a leading blade of the propeller will be referred to herein as blade-airflow structure interaction ("BAI"). BAI will be understood to include BVI, BWI, and/or any other interaction between a following blade of a propeller with an airflow structure shed from a leading blade of the propeller.

An airflow structure that is shed from the blade of the propeller is caused by the air pressure difference between the air beneath the blade of the propeller and the pressure of the air above the blade of the propeller. As the blade of the propeller passes through the air, the airflow at different pressures collide and spiral, creating airflow structures, such as vortices, that are shed off the blade of the propeller. BAI occurs when a following blade of a propeller passes through or within a close proximity of shed airflow structure(s) from a leading blade of the propeller. The passing of the blade through the airflow structures disrupts the formed airflow structures and causes a release of energy in the form of sound.

In some implementations, the inner surface area of the duct includes a plurality of rotating members that extend the length of the duct. A series of paddles are affixed to the rotating members that rotate in and out of alignment with the inner surface area of the duct. When rotating, some of the paddles are in alignment with the inner surface area of the duct, and paddles adjacent the aligned paddle are out of alignment, thereby forming an airflow channel along the inner surface of the duct.

The rotational speed of the rotating members may be coordinated with the rotational speed of the propellers such that an airflow channel formed by the paddles follows a blade tip of the propeller as the propeller rotates. By aligning the formed airflow channel with the blade tip of the propeller such that the airflow channel continues to form and follow the rotation of the propeller, some of the airflow structures shed off of the tip of the propeller, and other portions of the propeller (e.g., the trailing edge of the propeller blade) are collected by the airflow channel and carried by the channel away from the propeller.

In other implementations, the inner surface area of the duct may include a plurality of actuators that cover the inner surface area of the duct. The actuators may be individually addressable by a computing system such that each actuator may be activated or deactivated. When activated, the actuator protrudes toward the center of the duct and away from the inner surface area of the duct. When deactivated, the actuators are substantially in alignment with the inner surface area of the duct. The actuators may be activated in a spiral pattern such that a spiraled ridge is formed that follows a tip of a rotating propeller. In some implementations, two sets of actuators may be activated that form two spiral patterns in close alignment, forming an airflow channel there between. As the propeller rotates and sheds airflow structures, at least some of the airflow structures are collected by the ridge or active airflow channel and carried by the active airflow channel away from the propeller. By channeling collected airflow structures away from the propeller as the propeller rotates, the BAI of following blades is reduced, thereby reducing the sound generated by the propellers of the aerial vehicle.

The aerial vehicle may have any number of lifting motors and corresponding lifting propellers, some or all of which may have ducts with adjustable airflow channels. For example, the aerial vehicle may include four lifting motors and lifting propellers (also known as a quad-copter), eight lifting motors and lifting propellers (also known as an octo-copter), etc., one or more of which may be ducted with a duct that includes active airflow channels. Likewise, to improve the efficiency of horizontal flight, the aerial vehicle may also include one or more thrusting motors and thrusting propellers that are oriented at approximately ninety degrees to one or more of the lifting motors and/or the frame of the aerial vehicle. When the aerial vehicle is moving horizontally, the thrusting motor(s) may be engaged and the thrusting propeller will aid in the horizontal propulsion of the aerial vehicle. In some implementations, the rotational speed of the lifting motors may be reduced when the thrusting motor is engaged, thereby improving efficiency and reducing power consumption of the aerial vehicle. Likewise, in some implementations, the aerial vehicle may include a wing to aid in the vertical lift of the aerial vehicle while the aerial vehicle is moving horizontally. The thrusting motors and thrusting propellers may likewise be ducted with a duct that includes active airflow channels.

In some implementations, one or more of the ducted lifting motors and lifting propellers and/or one or more of the ducted thrusting motors and thrusting propellers may be adjustable and/or rotatable such that the ducted motor and propeller can operate to provide lift and/or thrust. For example, in some implementations, an aerial vehicle may include a ducted motor and propeller that is oriented in a first direction to provide lift when the aerial vehicle is moving in a direction that includes a vertical component (e.g., ascending or descending). The same ducted motor and propeller may be adjusted to a second position in which the ducted motor and propeller provide thrust when the aerial vehicle is moving in a direction that includes a horizontal component (e.g., navigating between an origin location and destination location).

In some implementations, the ducts may be formed of a single mold or uni-body design and the active components, such as the rotating members and/or actuators, may be coupled to or integrated into the inner portion of the mold. In other implementations, the exterior surface of the duct and the interior surface of the duct may be separate components that are coupled together. In some implementations, the exterior surface and the inner surface may be coupled together leaving a hollow portion, or cavity, there between. The paddles, when rotating, may rotate, at least partially, in and out of the cavity. Likewise, other components, such as wires, antennas, power supplies, etc., may be positioned in the hollow portion of the ducts.

FIG. 1 illustrates a view of an aerial vehicle 101, according to an implementation. In the example illustrated in FIG. 1, the aerial vehicle is a UAV. As illustrated, the aerial vehicle 101 includes a frame 104. The frame 104 or body of the aerial vehicle 101 may be formed of any suitable material, such as graphite, carbon fiber, aluminum, titanium, etc., or any combination thereof. In this example, the frame 104 of the aerial vehicle 101 is a single carbon fiber frame. The frame 104 includes a hub 106 and four ducts 100-1, 100-2, 100-3, and 100-4 with active airflow channels. A lifting motor and lifting propeller are also positioned within each duct 100, and encompassed by each duct 100. In this example, there is a single hub 106, four ducts 100, and a perimeter protective barrier 114 that extends around the ducts 100.

Lifting motors (not shown in FIG. 1) and corresponding lifting propellers (not shown in FIG. 1) are within each of the ducts 100 and, in this example, are approximately in-line with the frame 104. In this example, the length of each duct 100 above the frame is less than the length below the frame 104. In other implementations, the ducts may be positioned so that the length of the duct is approximately the same above and below the frame 104. In still other implementations, the ducts may be positioned so that the length above the frame 104 is greater than the length of each duct below the frame 104. Similarly, rather than having the lifting propellers and lifting motors approximately in-line with the frame 104, the lifting motors and lifting propellers may be positioned above or below the frame 104 within each duct 100.

The ducts may be of any size or shape around the propellers and motors. In some implementations, the circumference of the ducts may be substantially cylindrical and a defined amount larger in diameter than the propeller they surround. For example, the distance between the inner surface of the duct and the tips of the propeller blades of the propeller(s) positioned within the duct may be approximately 5 millimeters. In other implementations, the distance between the tips of the propeller blades and the inner surface of the duct may be greater or less than approximately 5 millimeters.

In some implementations, the diameter of the duct may change along the length of the duct. For example, the inlet 102-1, 102-2, 102-3, and 102-4 of each duct may have a greater diameter than the area of the duct near the propeller blades. Likewise, the exit 105-1, 105-2, 105-3, and 105-4 of each duct 100 may have a larger diameter than the area of the duct near the propeller blades. Alternatively, the inlet 102 and/or exit 105 of a duct may have a smaller diameter than the area of the duct near the propeller blades.

The lifting motors may be any form of motor capable of generating enough rotational speed with the corresponding lifting propellers to lift the aerial vehicle 101 and any engaged payload, thereby enabling aerial transport of the payload. Likewise, the lifting propellers may be any form of propeller (e.g., graphite, carbon fiber) and of a size sufficient to lift the aerial vehicle 101 and any payload engaged by the aerial vehicle 101 so that the aerial vehicle 101 can navigate through the air, for example, to deliver a payload to a delivery location. For example, the lifting propellers may each be carbon fiber propellers having a dimension or diameter of 736.6 millimeters. In such an example, the duct 100 surrounding the lifting propeller may have an inner surface area diameter near the propeller of 746.6 millimeters.

While the illustration of FIG. 1 shows the ducts 100 of the lifting propellers all of a same size, in some implementations, one or more of the ducts 100 may be different sizes, dimensions, and/or positioned differently with respect to the frame 104. Likewise, the lifting propellers and/or lifting motors within the ducts may be the same or different sizes. While this example includes four ducted lifting propellers, in other implementations, more or fewer propellers may be utilized as lifting propellers and more or fewer lifting propellers may be ducted. Likewise, in some implementations, the ducts 100 with lifting propellers may be positioned at different locations on the aerial vehicle 101. In addition, alternative methods of propulsion may be utilized as "motors" in implementations described herein. For example, fans, jets, turbojets, turbo fans, jet engines, internal combustion engines, and the like may be used with the ducted lifting propellers to provide lift and/or thrust for the aerial vehicle.

The ducts 100, in addition to the benefits discussed herein, provide safety for objects foreign to the aerial vehicle by encompassing the rotating propellers. Likewise, a perimeter protective barrier 114 provides safety for objects foreign to the aerial vehicle 101. For example, if the aerial vehicle 101 is traveling horizontally and collides with a foreign object (e.g., wall, building), the impact between the aerial vehicle and the foreign object will be with the perimeter protective barrier 114 and/or an exterior of a duct 100, rather than other components of the aerial vehicle. Likewise, because the frame is interconnected, the forces from the impact are dissipated across the frame.

The protective barrier 114 and the exterior surface of the ducts 100 provide surfaces upon which one or more components of the aerial vehicle may be mounted. For example, one or more antennas may be mounted to the perimeter protective barrier 114 and/or the exterior of one or more ducts 100. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, distance determining elements, gimbals, Global Positioning System (GPS) receiver/transmitter, radars, illumination elements, speakers, and/or any other component of the aerial vehicle 101 or the aerial vehicle control system (discussed below), etc., may likewise be mounted to the perimeter protective barrier 114 and/or an exterior of one or more ducts 100 of the aerial vehicle 101. Likewise, identification or reflective identifiers may be mounted to the protective barrier 114 and/or one or more of the ducts 100 to aid in the identification of the aerial vehicle 101.

In some implementations, the aerial vehicle 101 may also include a permeable material (e.g., mesh, screen) that extends over the entrance or rear of the ducts 100 to inhibit vertical access to the propellers from above or below the propellers.

An aerial vehicle control system 110 is also mounted to the frame 104. In this example, the aerial vehicle control system 110 is mounted to the hub 106 and between the four ducts 100-1, 100-2, 100-3, and 100-4. The aerial vehicle control system 110, as discussed in further detail below with respect to FIG. 11, controls the operation, routing, navigation, communication, motor controls, the payload engagement mechanism, and the active airflow channels of the ducts of the aerial vehicle 101.

Likewise, the aerial vehicle 101 includes one or more power modules (not shown). The power modules may be mounted to various locations on the frame. For example, in some implementations, four power modules may be mounted to the hub 106 of the frame and/or to one or more ducts 100. For example, the power modules may be positioned in a hollow portion formed between an exterior surface area and interior surface area of the ducts 100. The power module for the aerial vehicle may be in the form of battery power, solar power, gas power, super capacitor, fuel cell, alternative power generation source, or a combination thereof. The power module(s) are coupled to and provide power for the aerial vehicle control system 110, the lifting motors, the thrusting motors, the payload engagement mechanism, and the active airflow channels of the ducts 100, if power is needed.

In some implementations, one or more of the power modules may be configured such that it can be autonomously removed and/or replaced with another power module while the aerial vehicle is landed or in flight. For example, when the aerial vehicle lands at a location, the aerial vehicle may engage with a charging member at the location that will recharge the power module.

As mentioned above, the aerial vehicle 101 may also include a payload engagement mechanism (not shown). The payload engagement mechanism may be configured to engage and disengage items and/or containers that hold items. In this example, the payload engagement mechanism is positioned beneath and coupled to the hub 106 of the frame 104 of the aerial vehicle 101 and positioned between the four ducts 100. The payload engagement mechanism may be of any size sufficient to securely engage and disengage containers that contain items. In other implementations, the payload engagement mechanism may operate as the container, in which it contains item(s). The payload engagement mechanism communicates with (via wired or wireless communication) and is controlled by the aerial vehicle control system 110.

While the implementations of the aerial vehicle 101 discussed herein utilize propellers to achieve and maintain flight, in other implementations, the aerial vehicle may be configured in other manners. For example, the aerial vehicle may include fixed wings and/or a combination of both propellers and fixed wings.

In some implementations, in addition to the lifting motors and lifting propellers, the aerial vehicle 101 may include one or more thrusting motors 120 and corresponding thrusting propellers. Like the lifting motors and lifting propellers, the thrusting motors 120 and corresponding thrusting propellers may be ducted with a duct that includes an active airflow channel, as discussed further below. The thrusting motors 120 are mounted to the perimeter protective barrier 114 and/or the frame 104. The thrusting motors 120 and the thrusting propellers may be the same or different than the lifting motors and lifting propellers. In some implementations, the thrusting propeller may have a smaller dimension than the lifting propeller. In other implementations, the thrusting motors may utilize other forms of propulsion to propel the aerial vehicle. For example, fans, jets, turbojets, turbo fans, jet engines, internal combustion engines, and the like may be used (either with propellers or other devices) as the pushing motors. In some implementations, the thrusting motors 120 and thrusting propellers may be ducted with ducts that include active airflow channels, as discussed herein.

The thrusting motors 120 and thrusting propellers may be oriented at approximately ninety degrees with respect to the frame 104 of the aerial vehicle 101 and utilized to increase the efficiency of flight that includes a horizontal component. For example, when the aerial vehicle 101 is traveling in a direction that includes a horizontal component, the thrusting motors 120 may be engaged to provide horizontal thrust force via the thrusting propellers to propel the aerial vehicle 101 horizontally. As a result, the speed and power utilized by the lifting motors may be reduced. Alternatively, in selected implementations, the thrusting motors 120 may be oriented at an angle greater or less than ninety degrees with respect to the frame 104 to provide a combination of thrust and lift.

Utilizing two thrusting motors 120 and thrusting propellers mounted on opposite sides of the aerial vehicle 101, as illustrated in FIG. 1, the aerial vehicle 101 has an orientation during horizontal flight. Specifically, the aerial vehicle 101, when propelled horizontally using the thrusting motors and thrusting propellers alone or in combination with the lifting motors and lifting propellers, will orient and travel with the leading edge 122 oriented in the direction of travel. Additionally, utilizing two thrusting motors as shown in FIG. 1, rotation of the aerial vehicle 101 in the horizontal plane (i.e., yaw) may be adjusted by providing a thrust differential between the two thrusting motors. In some implementations, an airfoil or wing may likewise be mounted to the aerial vehicle 101 in accordance with the direction of travel to provide additional lift and increased efficiency to the aerial vehicle 101.

While the example discussed herein with respect to FIG. 1 illustrates an aerial vehicle with four ducted lifting motors and corresponding lifting propellers being used with two thrusting motors 120 and corresponding thrusting propellers, in other implementations, fewer or additional lifting motors and corresponding lifting propellers may be used in conjunction with one or more thrusting motors and thrusting propellers. For example, one or more thrusting motors and corresponding thrusting propellers may be mounted to the aerial vehicle 101. In other implementations, more or fewer thrusting motors and/or thrusting propellers may be utilized.

Figure 2:
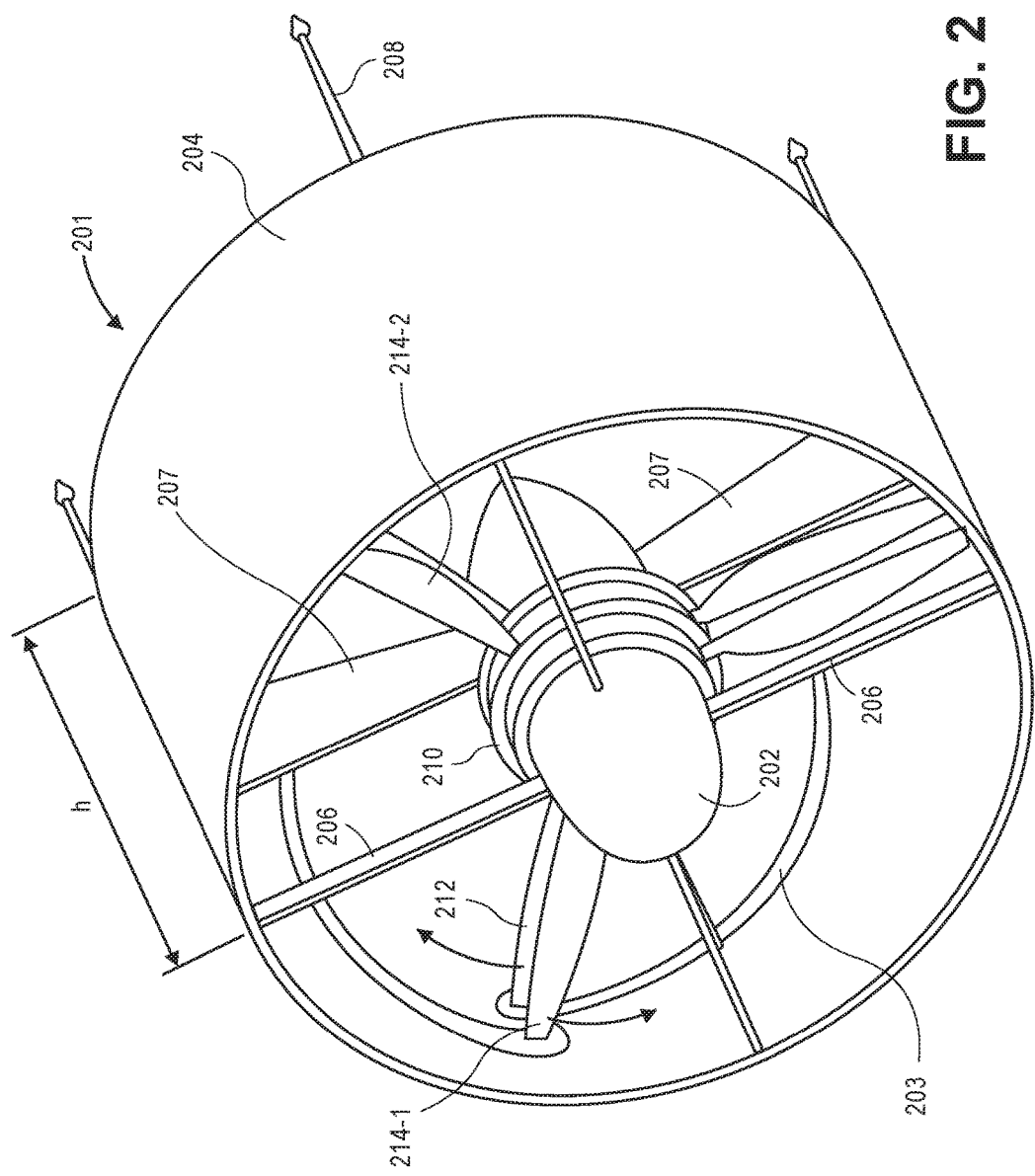
FIG. 2 depicts a diagram of an unmanned aerial vehicle with a center mounted fuselage and a closed, ducted wing, according to an implementation.

FIG. 2 illustrates a diagram of an aerial vehicle 201 having a center mounted fuselage 202 and a closed wing that also functions as a duct 204 with active airflow channels 203, according to an implementation. As illustrated, the motor 210 is positioned such that it surrounds a portion of the cylindrical fuselage 202. Likewise, the propellers 212, 214 are mounted to an exterior of the motor 210 and extend radially outward from the center-mounted fuselage 202 and the motor 210. When the motor 210 rotates, it causes the first set of propellers 214 to rotate in a first direction and the second set of propellers 212 to rotate in a second direction that is opposite the first direction, thereby canceling out the torque generated by the propellers.

The closed wing or duct 204 is coupled to the fuselage 202 by the front support arms 206 and the rear support arms 207. The closed wing or duct 204 is substantially cylindrical and has a height ("h") and a radius that is sufficient to encompass the propellers 212, 214 and provide lift to the aerial vehicle 201 when the aerial vehicle is aerially navigating in a direction that includes a horizontal component. By also functioning as a duct 204 that encompasses the propellers, the closed wing provides perimeter protection around the propellers and enables use of active airflow channels 203 along the inner surface area of the closed wing or duct. As discussed further below, the active airflow channels 203 are formed along the inner surface of the duct 204 and follow the rotation of the propellers 214, 212 so that airflow structures shed from the blades of the propellers 214, 212 are collected by the active airflow channels 203 and channeled by the active airflow channels 203 away from the blades of the propellers.

The closed wing or duct 204 may include any type of aerodynamic shape that results in lift when the aerial vehicle 201 is flying in a direction that includes a horizontal component and that allows the formation of the active airflow channels 203 that will collect and channel airflow structures away from the blades of the propellers. Likewise, one or more of the support arms 206, 207 may include an airfoil design that aids in the lift of the aerial vehicle when the aerial vehicle is traveling in a horizontal direction. Likewise, one or more of the support arms 206, 207 may operate as a rudder to stabilize flight of the aerial vehicle, and one or more of the support arms 206, 207 may include ailerons that can be adjusted by the aerial vehicle control system to cause the aerial vehicle 201 to pitch, yaw, and/or roll.

The aerial vehicle 201 also includes landing arms 208 upon which the aerial vehicle rests when landed on a surface. When the aerial vehicle 201 is landed, it rests on the landing arms 208 such that the fuselage 202 is oriented so that the cylindrical shape is vertical and the top of the fuselage is pointed away from the surface. When the motor (s) of the aerial vehicle are engaged, causing the propellers to rotate, the propellers provide lift to the aerial vehicle. The support arms 206, 207, acting as rudders and/or ailerons control and stabilize the aerial vehicle 201 and it ascends vertically. As the aerial vehicle ascends, the aerial vehicle control system may cause the aerial vehicle 201 to pitch so that the flight of the aerial vehicle transitions from vertical to horizontal. As the aerial vehicle 201 pitches, the closed wing or duct 204 creates lift as the aerial vehicle moves horizontally, thereby improving the efficiency of the aerial vehicle 201 and extends the flight of the aerial vehicle 201.

The motor(s) 210 are mounted to and surround the fuselage 202. For example, the stator of the motor 210 may be mounted to a perimeter of the cylindrical shape of the fuselage 202. Alternatively, the stator of the motor 210 may be incorporated into the fuselage 202. For example, the fuselage has a first radius and the stator has a second radius that is substantially similar to the first radius. The stator includes a plurality of electromagnets that are controlled by the aerial vehicle control system to control a rotational speed of the motor and, thus, the speed of the propellers connected to the motor.

The rotor, which includes a plurality of magnets, is positioned adjacent the stator and rotates around the stator when the stator is energized by the aerial vehicle control system. The propellers 212, 214 are mounted to the exterior of the rotor and extend radially away from the center of the fuselage of the aerial vehicle 201 and the rotor.

In some implementations, the motor is effectively configured as a brushless DC out-runner motor such that the stator, which includes electromagnets, is stationary and positioned within the rotor, which rotates around the stator. In contrast to a traditional out-runner motor, rather than the propellers being mounted to a shaft that extends from a top of the rotor, the propellers are coupled to the exterior side of the rotor and extend radially outward from the rotor. Likewise, by increasing the diameter of the stator, and thus the rotor, the fuselage can be positioned within the center of the stator such that the propellers rotate around the fuselage.

The fuselage may be substantially hollow to reduce a weight of the aerial vehicle 201 and to provide a cavity into which the aerial vehicle control system, power supply, payload, etc., may be stored. Likewise, in addition to a substantially cylindrical shape, as illustrated in FIG. 2, the tip or front of the fuselage may be rounded to improve the aerodynamics of the aerial vehicle 201.

Additional details of an aerial vehicle with a center mounted fuselage 202 and corresponding closed wing are provided in U.S. patent application Ser. No. 14/860,377, filed on Sep. 21, 2015 and titled UNMANNED AERIAL VEHICLE WITH CENTER MOUNTED FUSELAGE AND CLOSED WING, which is commonly owned by Applicant and incorporated herein by reference in its entirety.

As discussed further below, the active airflow channels 203 along the inner surface of the closed wing or duct 204 may be configured to follow the tips of the propellers 212, 214 as the propellers rotate to collect at least some of the shed airflow structures and move the collected airflow structures away from the propellers 212, 214 to reduce BAI and the resulting sounds. For example, by channeling at least some of the airflow structures shed from the propeller blade 214-1 away from the propeller 214 through use of an active airflow channel 203, the airflow structures will be removed from the area so that the following propeller blade 214-2 does not pass through the shed airflow structures that are collected. By channeling the collected airflow structures away from the propeller such that the following propeller blade does not pass through the collected airflow structures, BAI is reduced and thus sound created through BAI is reduced.

While the examples discuss channeling shed airflow structures away from the propeller, it will be appreciated that the active airflow channels may not channel all shed airflow structures away from the propeller and the following propeller blade may pass through some of the airflow structures shed from a leading propeller blade. However, channeling away and removal of even some of the shed airflow structures reduces BAI and the corresponding sound generated from BAI.

Figure 3:
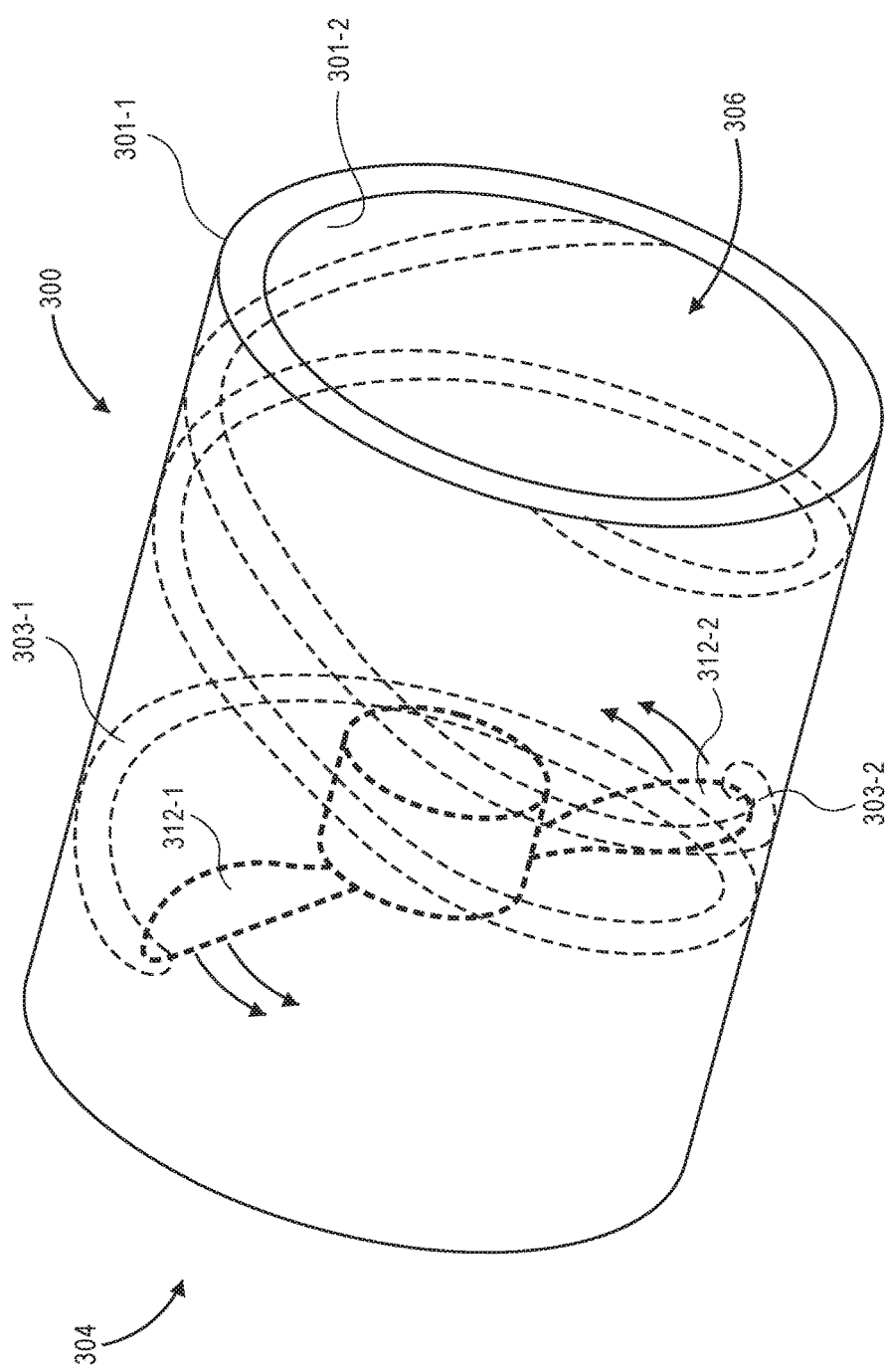
FIG. 3 depicts a diagram of a ducted propeller, according to an implementation.

FIG. 3 depicts a diagram of a propeller 312 within a duct 300 that includes active airflow channels 303-1, 303-2, according to an implementation. As illustrated, the duct 300 includes an out surface area 301-1 and an inner surface area 301-2. The active airflow channels are formed on the inner surface area 301-1, as discussed further below. In some implementations, there may be a cavity or hollow area between the outer surface area 301-1 and the inner surface area 301-2 of the duct 300. The cavity may be used, for example, to pass control wires from the control system of the aerial vehicle to actuators positioned along the inner surface area 301-1 that are actively controlled and used to form the active airflow channels. In other implementations, tubes or hoses may be positioned within the cavity and configured so that air is drawn into the tubes near an inlet 304. The opposing ends of the tubes terminate at different points within the inner surface area of the duct 300 so that the air passing through the tubes is expunged into the duct at a location behind the propeller 312. This additional air passing into the duct from behind the propeller 312 creates turbulence that reduces resonant frequencies and effectively creates a broadband sound that is similar to white noise (a noise containing many frequencies with equal intensities).

As discussed further below, when the propeller 312 rotates, active airflow channels are formed along the inner surface area 301-2 of the duct 300 at a position adjacent the tip of each propeller blade 312-1, 312-2. The active airflow channels are formed in a spiral pattern that begins at the tip of each propeller blade 312-1, 312-2 and extends back and out the exit 306 of the duct 300. As the propeller 312 rotates, the position of the active airflow channels 303 are updated so that they continually follow the tips of the propeller blades around the inner surface area 301-2 of the duct 300. A variety of techniques may be used to form and position the active airflow channels 303 along the inner surface area of the duct 300, some of which are illustrated in further detail below with respect to FIGS. 4-9. In general, the width and/or depth of the active airflow channels may vary. In some implementations, the width of the active airflow channel is approximately 105% of the width of the blade of the propeller. In other implementations, the width of the propeller blade may be larger or narrower.

Figure 4:
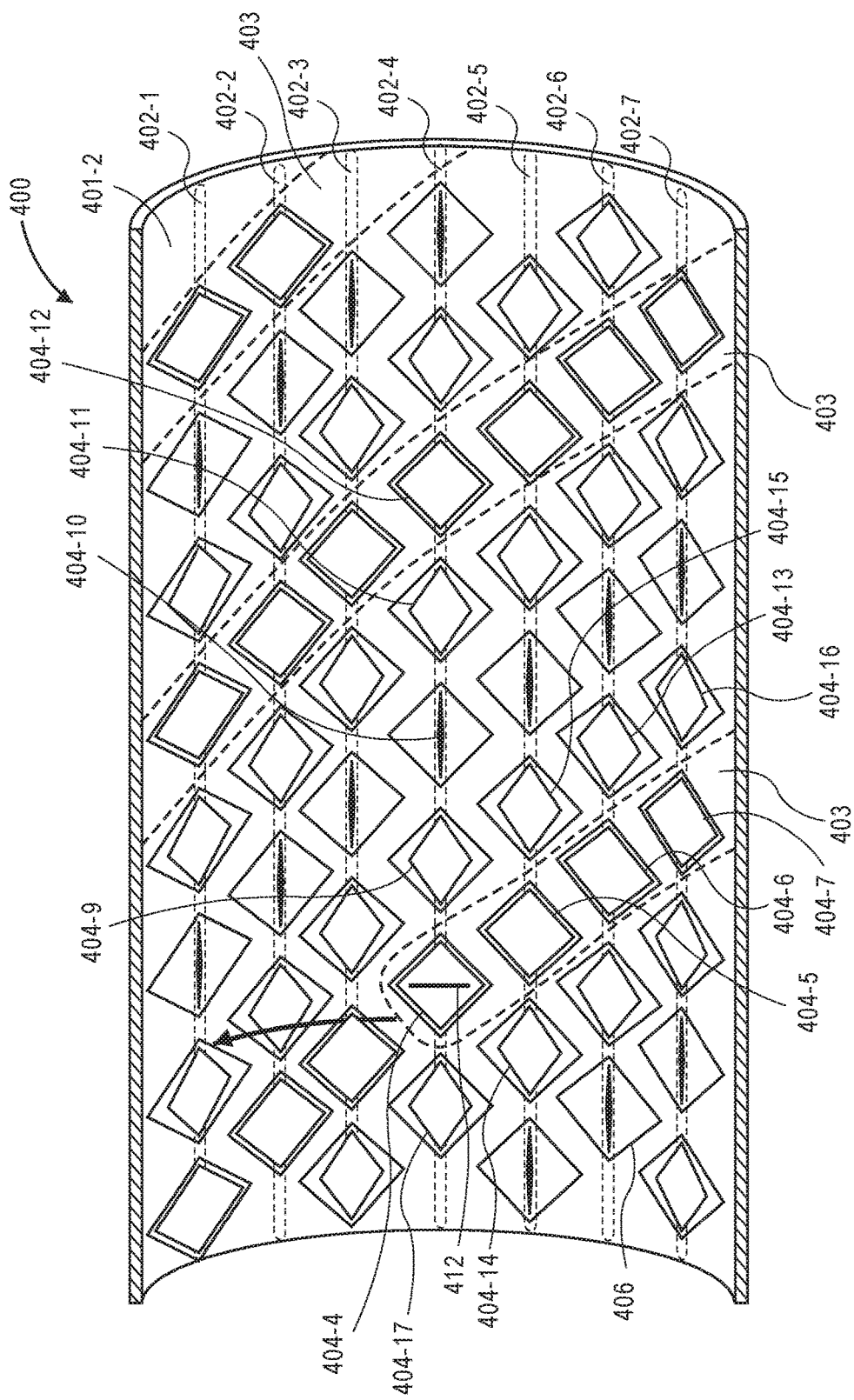
FIGS. 4-9 depict diagrams of cutout side-views of a duct of a ducted propeller, according to various implementations.

FIG. 4 depicts a diagram of a cutout side-view of a duct 400 showing the inner surface area 401-2 in which the active airflow channels 403 are formed, according to an implementation. In this example, there are a plurality of rotating members 402 that extend along the length of the inner surface area 401-2 of the duct 400. As discussed further below with respect to FIGS. 6-7, the rotating members are configured to rotate as the propeller 412 is rotating. Attached to each rotating member 402 are a series of paddles 404 that rotate with the rotating member 402. As the paddles 404 rotate, the paddles move from a position in which they are substantially in-line with the inner surface area 401-2 of the duct 400 to out of alignment with the inner surface area 401-2 of the duct 400. Likewise, as illustrated, the paddles on each rotating member 402 are affixed to the rotating members 402 so that the paddles are offset with respect to other paddles affixed to that rotating member 402. For example, referring to rotating member 402-4, when paddle 404-4 is substantially in-line with the inner surface area 401-2 of the duct, paddle 404-9 is approximately forty-five degrees out of alignment with the inner surface area 401-2 of the duct 400, paddle 404-10 is approximately ninety degrees out of alignment with the inner surface area 401-2 of the duct, paddle 404-11 is approximately one-hundred thirty-five degrees out of alignment with the inner surface area of the duct 400, and paddle 404-12 is approximately in-line with the inner surface area of the duct 400.

The positioning of the paddles 404 at different orientations along each rotating member 402 may continue down the length of each rotating member, each paddle having a different orientation than adjacent paddles 404. While this example shows the paddles offset approximately forty-five degrees from each adjacent paddle in a spiral pattern, in other implementations, the offset may be greater or less than forty-five degrees, and/or spiral in the same or opposite direction. Likewise, the spiral pattern of the paddles of adjacent rotating members 402 may be the same or different. For example, rotating member 402-5 may spiral in a clockwise direction while rotating member 402-6 spirals in a counter-clockwise direction. In some implementations, rather than having a defined offset between paddles on a rotating member, the offset may be random such that each paddle of a rotating member may be randomly positioned on the rotating member 402.

The rotating members 402 may be at defined positions and distances from adjacent rotating members 402. There may be any number of rotating members 402 within a duct 400 and each rotating member may have any number of paddles. In FIG. 4 the seven illustrated rotating members 402-1, 402-2, 402-3, 402-4, 402-5, 402-6, and 402-7 are spaced a defined distance apart so that the paddles 404 between adjacent rotating members are diagonally positioned. In comparison, referring briefly to FIG. 5, the rotating members 502 are spaced a second defined distance so that the paddles on adjacent rotating members are aligned horizontally around the inner surface area 501-2 of the duct 500. Likewise, the paddles may be of any size and/or shape. In some implementations, the paddles are approximately 10 millimeters ("mm") wide, by approximately 10 mm long, by approximately 1 mm thick. In other implementations, the paddles may have different dimensions along any one or more of the length, width, and thickness of the paddle. The paddles may be affixed to the rotating members such that when the paddles are approximately ninety-degrees out of alignment with the inner surface area 401-2, the peak or point of the paddle protrudes approximately 3.54 mm above the inner surface area 401-2 toward a center of the duct.

Returning to FIG. 4, the inner surface area 401-2 may be a smooth, substantially cylindrical material that lines the interior of the duct 400. As discussed above, the inner surface area 401-2 may be formed of any material and may be coupled to the outer surface area 401-1. Likewise, there may be a hollow area or cavity between the inner surface area 401-2 and the outer surface area 401-1. The inner surface area 401-2 may also include a series of openings 406 in which the paddles 404 are positioned and allowed to rotate. For example, the rotating members 402 may be coupled to a side of the inner surface area that is within the cavity formed between the inner surface area 401-2 and the outer surface area 401, or the rotating members may be positioned in the cavity but not coupled to the inner surface area 401-2. The paddles 404 affixed to the rotating members are positioned to align with and rotate within the openings 406 so that, when the paddles are rotated and not substantially aligned with the inner surface area 401-2, a portion of the paddle protrudes into the cavity or hollow area between the inner surface area 401-2 and the outer surface area 401-1, and another portion of the paddle protrudes into the interior or central area of the duct 400.

In some implementations, the openings 406 may be a cutout in the inner surface area. In other implementations, the openings 406 may be indentations that protrude into the hollow portion or cavity between the inner surface area 401-2 and the outer surface area 401-1 a distance sufficient to allow the paddles 404 to rotate within the indentations. In still other implementations, there may be no inner surface area that forms a cavity with the outer surface area other than the rotating members 402 and the paddles 404. For example, the rotating members 402 and the paddles 404 may be aligned and sized so that the edges of the paddles are within a defined distance from the edges of adjacent paddles 404, forming a checkerboard pattern within the duct 400. For example, a tip of a first paddle 404-7 on rotating member 402-7 may be positioned such that it is approximately 1 millimeter away from the tip of a second paddle 404-16 on the rotating member 402-7. Likewise, the adjacent paddles 404-6 and 404-13, both of which are affixed to rotating member 402-6, may be positioned such that the edges of those two paddles would be approximately 1 millimeter from the corresponding edges of paddle 404-7 if those paddles were substantially aligned. By tightly spacing the rotating members and the paddles, the interior surface area 401-2 may be removed and the rotating members 402 and paddles 404 may function as both the interior surface area and for actively forming airflow channels 403.

In one example, the airflow channels are formed by rotating the rotating members 402 at a speed that corresponds to a rotational speed of the propeller 412 such that a paddle 404-4 that is just beyond the tip of the propeller 412 is substantially aligned with the interior surface area 401-2 of the duct 400. As discussed above, because the paddles on the same rotating member may be offset with respect to adjacent paddles, when one paddle 404-4 is substantially aligned with the interior surface area 401-2, the adjacent paddles 404-9 and 404-17 are not aligned and protrude into the duct 400, thereby creating a first ridge or wall and a second opposing ridge or wall of the active airflow channel 403. The paddle 404-4 that is substantially aligned with the inner surface area 401-2 forms the floor of the active airflow channel 403.

Likewise, the paddles 404 of the adjacent rotating member 402-5 may be positioned with respect to the paddles of rotating member 402-4 such that when paddle 404-4 is substantially aligned with the interior surface area 401-2, the paddle 404-5 on rotating member 402-5 that is adjacent paddle 404-4 and offset away from the propeller 412 is also substantially aligned with the interior surface area, continuing the floor of the active airflow channel away from the propeller 412. Likewise, the paddles 404-14, 404-15 on either side of paddle 404-5 that are affixed to rotating member 402-5 are offset from the interior surface area, thereby continuing the first and second wall or ridge of the active airflow channel 403. This alignment of paddles continues in a spiral fashion around the interior surface area 401-2 of the duct 400 creating the active airflow channel 403 that spirals away from the propeller 412 and to the exit of the duct 400.

For propellers with multiple propeller blades (i.e., two or more), the rotating members 402 and paddles 404 may be positioned so a paddle just beyond the tip of each rotating propeller blade is substantially in-line with the interior surface area 401-2 of the duct 400 and the other paddles align to form ridges and floors of an active airflow channel that spirals away from each propeller blade tip and out the exit of the duct 400. By rotating the rotating members and paddles as the propeller turns, the active airflow channels follow along with the propeller blades collecting at least some of the shed airflow structures and channeling the collected airflow structures out the exit of the duct, thereby reducing BAI and the sound generated by BAI.

Figure 5:
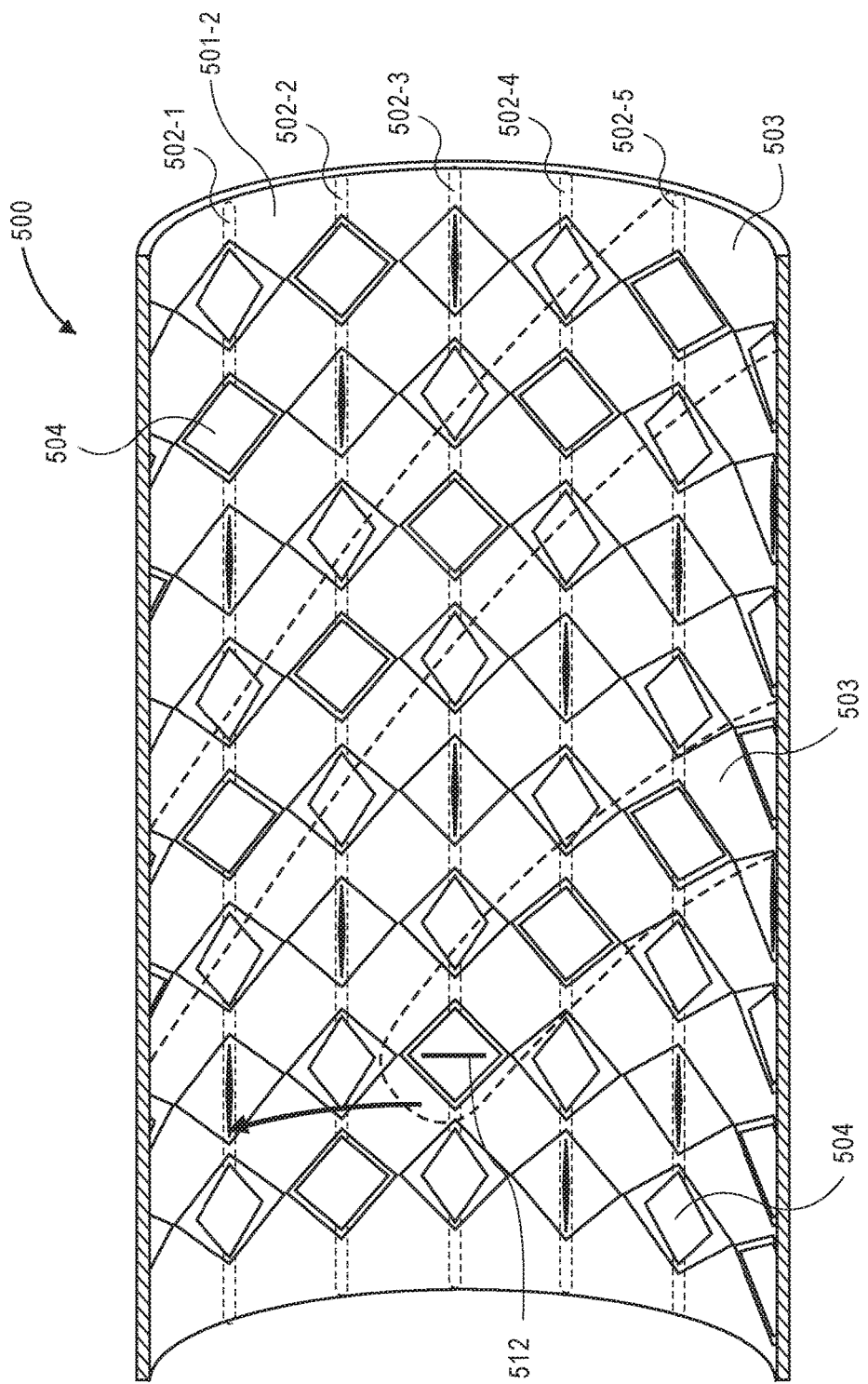

FIG. 5 depicts a diagram of a cutout side-view of a duct 500 showing the inner surface area 501-2 in which active airflow channels 503 are formed, according to an implementation. The configuration illustrated in FIG. 5 is one alternative to the configuration illustrated in FIG. 4. In this example, there are five rotating members 502-1, 502-2, 502-3, 502-4, and 502-5 illustrated. Likewise, the paddles 504 of each rotating member 502 are positioned so that paddles are aligned horizontally around the interior of the duct 500. Similar to the example discussed with respect to FIG. 4, in this example, the paddles 504 are affixed to the rotating members 502 such that they are offset in a spiral fashion so that when one paddle is substantially aligned with the interior surface area 501-2, the adjacent paddles on the rotating member 502 are not aligned with the interior surface area. Likewise, the rotating members and paddles are configured to rotate with the rotation of the propeller 512 blades so that the paddle 504 nearest the tip of the propeller 512 blade is substantially aligned with the interior surface area 501-2 and adjacent paddles 504 are positioned to form the floor and ridges or walls of active airflow channel 503 so that at least some of the airflow structures shed from the propeller 512 blade are collected and channeled out the exit of the duct 500.

As discussed above, the position, size, shape, and/or density of the rotating members and/or paddles may vary. Likewise, the shape of the paddles may vary. For example, the paddles may be diamond shaped, as illustrated, round, square, rectangular, or any other polygonal shape. Likewise, in some implementations, the paddles within a duct may all be the same shape and/or size or some of the paddles may be different shapes and/or sizes. Still further, rather than orienting the paddles to form active airflow channels that collect the airflow structures shed from the propeller blades, in some implementations, the paddles may be configured to simply rotate within the duct, moving in and out of alignment with the interior surface area 501-2 without creating any patterns or active airflow channels. In such an implementation, the rotation of the paddles continually changes the configuration and surface contour of the interior surface area 501-2, thereby disrupting the airflow through the duct. The disrupted airflow generates a broadband sound that is similar to white noise, rather than resonant frequencies. The white noise cancels out, reduces, and/or masks other sounds generated by the aerial vehicle.

Figure 6:
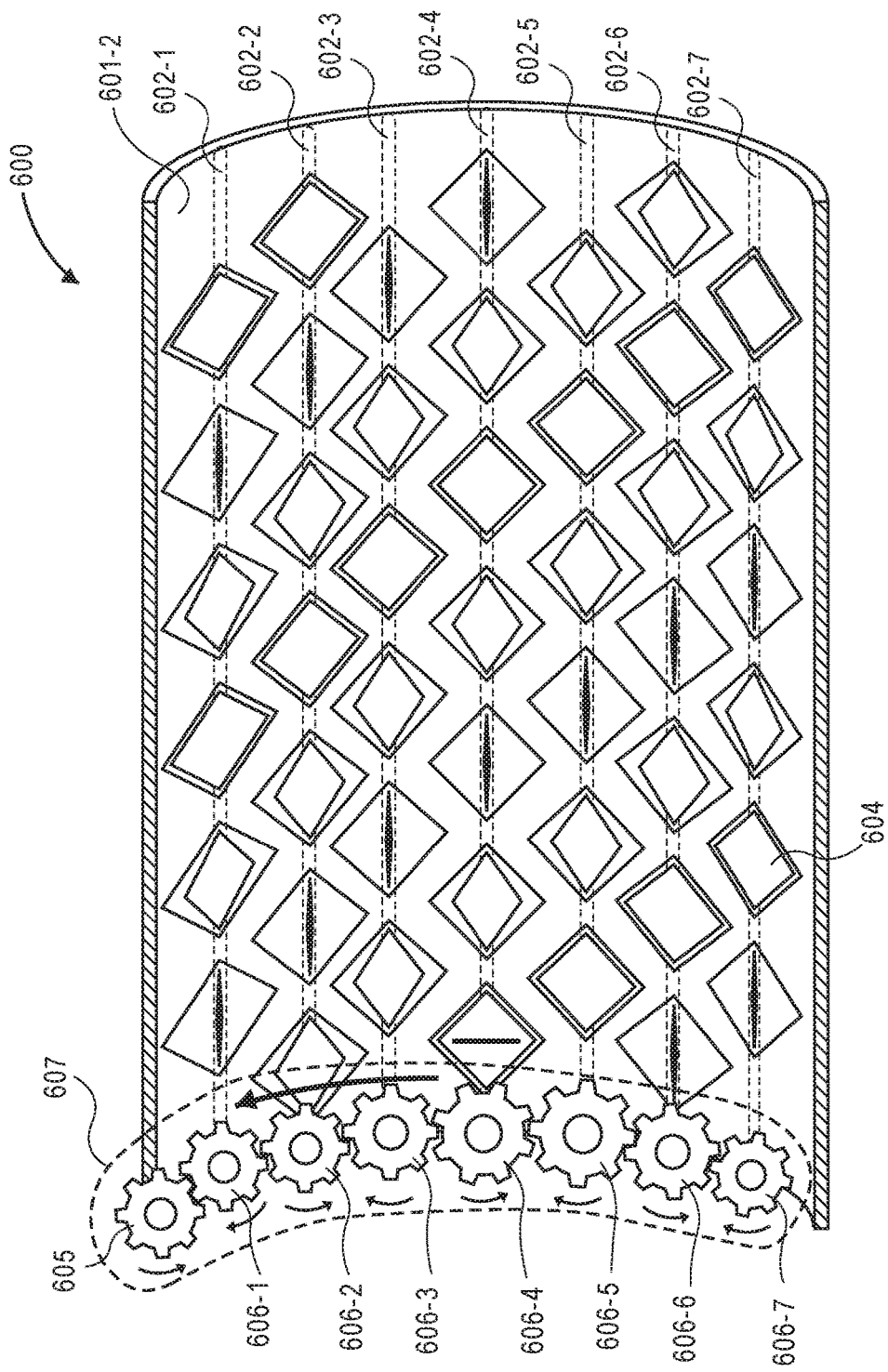

FIG. 6 depicts a diagram of a cutout side-view of a duct 600 showing the inner surface area 601-2 that includes a plurality of rotating members 602-1, 602-2, 602-3, 602-4, 602-5, 602-6, and 602-7, according to an implementation. In this example, one configuration of a gear system 607 is illustrated that may be used to cause rotation of the rotating members 602 that, in turn, cause the paddles 604 to rotate. In this example, each rotating member 602 includes a gear 606-1, 606-2, 606-3, 606-4, 606-5, 606-6, and 606-7. The teeth of each adjacent gear 606-1-606-7 interconnect so that when one gear is rotated all gears rotate. By directly interconnecting adjacent gears, each rotating member will rotate in an opposite direction. For example, if gear 606-1 causes rotating member 602-1 to rotate in a clockwise direction, the interconnection between gear 606-1 and 606-2 will cause gear 606-2 and rotating member 602-2 to rotate in a counter-clockwise direction. In such a configuration, the positioning of the paddles on adjacent rotating members may be inverted. For example, the positioning of the paddles 604 on rotating member 602-1 are oriented so that they are offset in a clockwise configuration down the rotating member 602-1. The paddles affixed to rotating member 602-2 may be offset in a counter-clockwise configuration. In other examples, the paddles of different rotating members may be offset in the same orientation.

In this example, there may be a single drive gear 605 that controls the rotation and the speed of rotation of the rotating members 602. In some implementations, the drive gear 605 may be coupled to the motor that rotates the propeller positioned within the duct 600 so that, when the motor that rotates the propeller turns, it causes the drive gear 605 to turn, which results in the rotation of the rotating members 602 within the duct 600. In other implementations, the drive gear 605 may be controlled and rotated by an active airflow channel controller and motor, as discussed below.

The drive gear 605, and/or the gears 606 may be sized so that the rotating members rotate at a speed that corresponds with the speed of the propeller within the duct so that the paddles are aligned, as discussed above, to form active airflow channels that follow the tips of the propeller blades, collecting at least some of the shed airflow structures and channeling the collected airflow structures away from the propeller. Alternatively, the drive gear 605 and/or the gears 606 of the rotating members 602 may vary in size so that different rotating members rotate at different speeds. Rotating the rotating members at different speeds is beneficial when generating white noise by varying the contour of the inner surface area of the duct.

Figure 7:
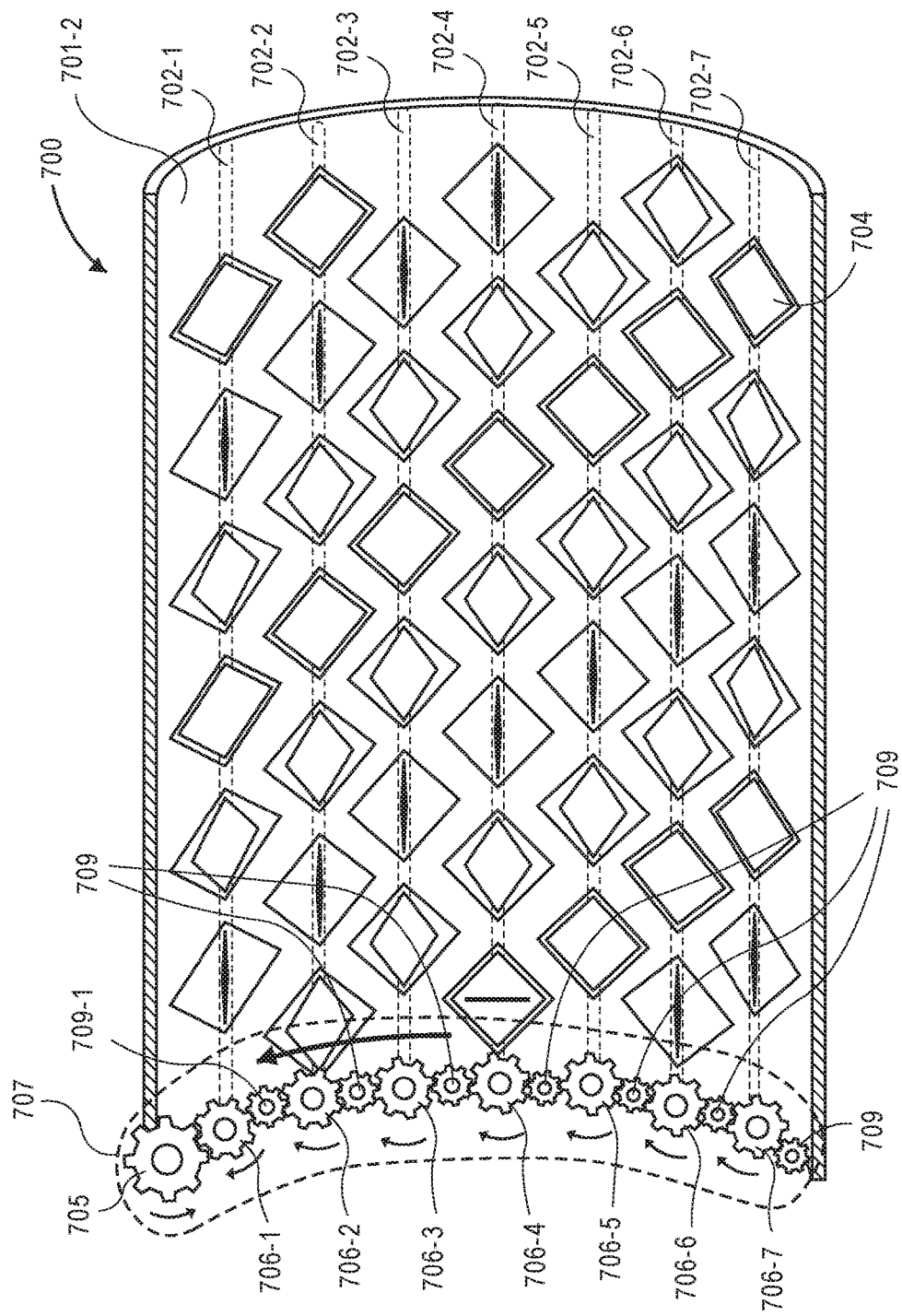

FIG. 7 depicts a diagram of a cutout side-view of a duct 700 showing the inner surface area 701-2 that includes a plurality of rotating members 702-1, 702-2, 702-3, 702-4, 702-5, 702-6, and 702-7, according to an implementation. In this example, another configuration of a gear system 707 that may be used to cause rotation of the rotating members 702 that, in turn, cause the paddles 704 to rotate, is illustrated. In this example, each rotating member 702 includes a gear 706-1, 706-2, 706-3, 706-4, 706-5, 706-6, and 706-7. Between each gear 706 that is coupled to a rotating member 702 is a secondary gear 709. The teeth of each gear 706-1-706-7 interconnect with teeth of an adjacent secondary gear 709 so that, when one gear is rotated, all gears rotate. By interleaving each of the gears 706 that are coupled to a rotating member 702 with a secondary gear 709, each of the gears 706 and coupled rotating members rotate in the same direction. For example, if the drive gear 705 rotates in a counter-clockwise direction, it will cause the gear 706-1 to rotate in a clockwise direction. The gear 706-1 will cause the secondary gear 709-1 to rotate in a counter-clockwise direction, which will cause gear 706-2 and rotating member 702-2 to rotate in a clockwise direction. This alternating rotation continues, resulting in each of the rotating members rotating in a clockwise direction. In such a configuration, the positioning of the paddles on each rotating member may be similar so that they are rotating uniformly. Alternatively, the positioning of the paddles may vary.

Similar to the drive gear 605 (FIG. 6), in this example, there may be a single drive gear 705 that controls the rotation and the speed of rotation of the rotating members 702. In some implementations, the drive gear 705 may be coupled to the motor that rotates the propeller positioned within the duct 700 so that, when the motor that rotates the propeller turns, it causes the drive gear 705 to turn, which results in the rotation of the rotating members 702 within the duct. The drive gear 705, the gears 706, and/or the secondary gears 709 may be sized so that the rotating members rotate at a speed that corresponds with the speed of the propeller within the duct. Rotating the rotating members at a speed that corresponds with the rotational speed of the propeller within the duct allows the paddles, as discussed above, to form active airflow channels that follow the tips of the propeller blades, collecting at least some of the shed airflow structures and channeling the collected airflow structures away from the propeller. Alternatively, the drive gear 705, the gears 706, and/or the secondary gears of the rotating members 702 may vary in size so that different rotating members rotate at different speeds.

While the examples discussed with respect to FIGS. 6-7 describe a drive gear that is motor driven and used to cause rotation of the gears coupled to the rotating members, in some implementations, one of the rotating members and/or a gear coupled to a rotating member may be coupled to a motor, such as the lifting propeller motor, that rotates the propeller motor within the duct. In such a configuration, a dedicated drive gear is not necessary. Likewise, in some implementations, rather than causing rotation of the rotating members using the motor that rotates the propeller within the duct, the gears that cause rotation of the rotating members may be driven by a motor that is independent of the motor that rotates the propeller within the duct. In such an implementation, the motor that causes rotation of the gears may receive instructions from the active airflow channel controller of the control system indicating a speed at which the rotating members are to be rotated. The motor, in response, turns the gears at a speed necessary to cause rotation of the rotating members at the commanded speed.

In some implementations, rather than using gears to rotate the rotating members, other drive mechanisms may be used. For example, a cable system may be integrated within the rotating members and, as the cable is moved, it causes the rotating members to rotate.

Figure 8A:
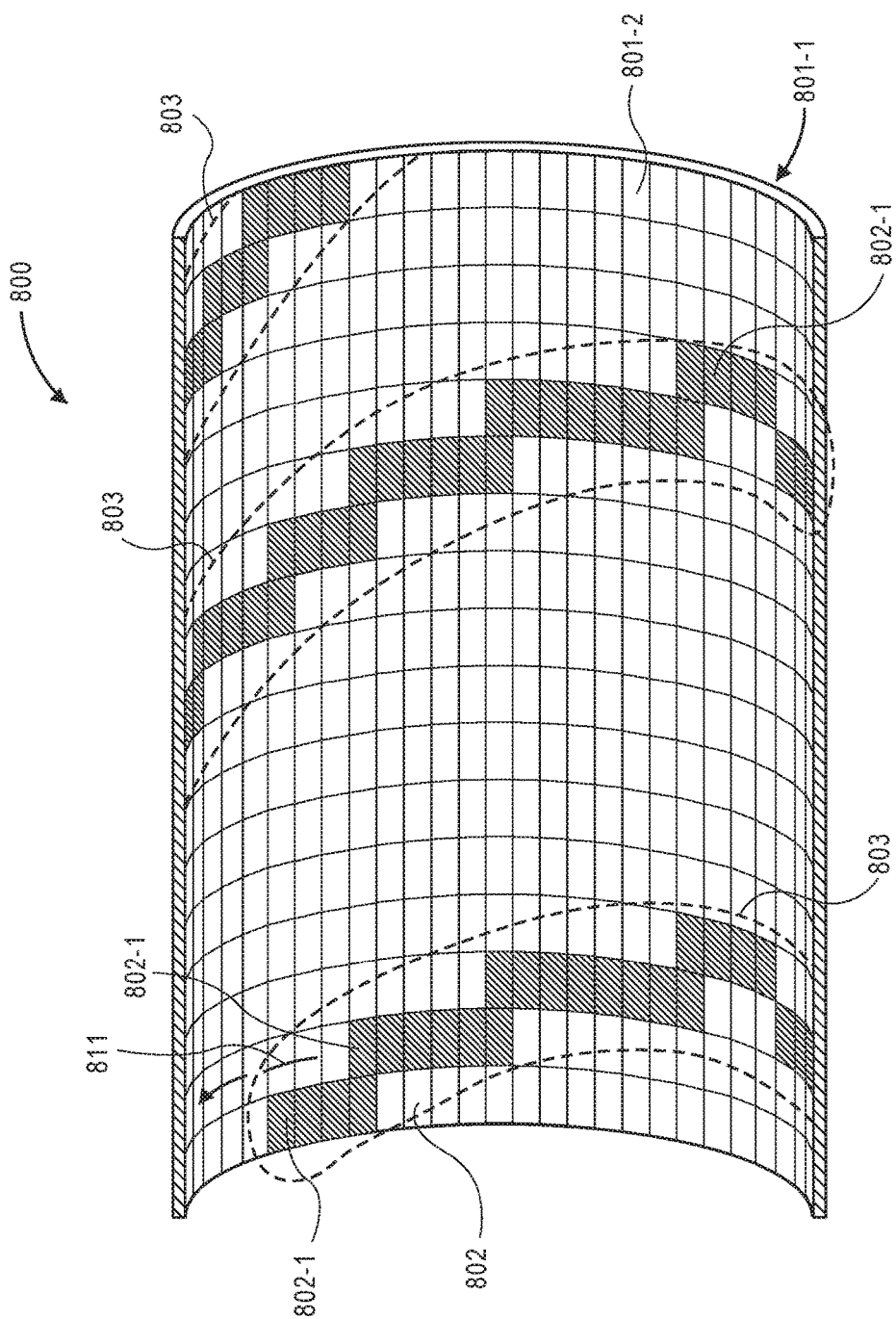

FIG. 8A depicts a diagram of a cutout side-view of a duct 800 showing the inner surface area 801-2 in which the active airflow channels 803 are formed, according to an implementation. In this example, there are a plurality of actuators 802 positioned to form the interior surface area 801-2 of the duct. The actuators 802 may be hinged on one side so that they may be opened or oriented toward a center of the duct and protrude into the central portion of the duct 800. In another example, the actuators may include piezoelectric actuators, solenoids, pneumatics, or another type of actuator that cause the actuator 802 to expand and protrude toward the center of the duct when activated, or retract and become substantially aligned with the other actuators 802 when deactivated. In general, the actuators may be any type of device that may be moved or positioned between a first position, in which the actuator is substantially in-line with the interior surface area of the duct 800, and a second position, in which the actuator protrudes inward into the central portion of the duct 800, thereby altering the contour of the interior surface area of the duct and disrupting the airflow through the duct 800. The height of the protrusion above the inner surface area may vary depending the size, shape, and/or configuration of the actuator. For example, in some implementations, when activated, the actuators may protrude between approximately 1 mm and 5 mm above the inner surface area. In other implementations, the protrusion may be greater or less.

The actuators may each be individually addressable by an active airflow channel controller that causes the actuators to move between a first position in which they are substantially aligned with the interior surface area 801-2 of the duct 800 and a second position in which they protrude into the central portion of the duct 800, altering the airflow through the duct. For example, wired communication may be enabled between the active airflow channel controller and each actuator by passing wires through the hollow area or cavity formed between the exterior surface area 801-1 of the duct and the inner surface area of the duct 801-2.

In some implementations, each actuator may be assigned a unique position or identifier. The active airflow channel controller may send an instruction to each actuator that includes an identification of each actuator that is to move between positions. Alternatively, each actuator 802 may be synchronized to a master clock and/or to the active airflow channel controller and the active airflow channel controller may send instructions to each actuator indicating a timing or frequency with which the actuator is to move between the first position and the second position. For example, a position of the tips of the blades of a propeller within the duct 800 may be known and the propeller revolutions per minute (RPM) may be determined based on the commanded speed of the motor that is rotating the propeller. Utilizing this information, and a known diameter of the interior surface area of the duct 800, an actuator frequency (the frequency with which an actuator is to move from a first position to a second position) is determined for each actuator. Likewise, an initialization time may be determined that indicates when the actuator is to begin the frequency of moving between positions. These instructions are then sent to each actuator and the actuators will utilize the instruction to begin moving between a first position and a second position according to the instructed frequency. If the RPMs of the propeller change, updated instructions may be sent to the actuators causing the actuators to alter the frequency of actuation.

In some implementations, the instructions are sent to the actuators such that the actuators will activate in a pattern that will result in an active airflow channel forming that begins at the tip of each blade of the propeller 811 and spirals around the interior surface area of the duct 800 and out the exit of the duct. For example, FIG. 8A illustrates a configuration in which the actuators 802-1 are in a second position such that they protrude into the duct forming a ridge or wall that begins adjacent the propeller 811 and spirals around the interior of the duct 800 and out the exit of the duct 800. As the propeller 811 rotates, different actuators activate or deactivate to move between the first position and the second position so that the formed active airflow channel follows the position of the propeller, collecting at least some of the shed airflow structures and channeling the collected airflow structures away from the propeller so that the following propeller does not pass through those airflow structures.

As will be appreciated, any pattern or configuration may be formed by sending different instructions to the actuators. In some implementations, the actuators may be instructed to actuate randomly rather than in a controlled pattern. In such an implementation, the random actuation causes the shape or contour of the interior surface area to continually change, thereby creating turbulence in the airflow passing through the duct 800. The turbulent air from the varied shape of the surface area reduces resonant frequencies and effectively creates a broadband sound that is similar to white noise. In still another example, the actuators may be configured to randomly actuate unless they receive instructions to activate or deactivate at a particular time or frequency. For example, the actuators may randomly actuate when they are not being instructed to form a portion of an active airflow channel.

In the example illustrated in FIG. 8A, a single ridge is generated by the actuators 802 that have been activated, illustrated as the actuators 802-1 with a hatched pattern. The actuators 802 that are not grey colored or hatched represent actuators that are substantially in-line with the interior surface area 801-2 of the duct. The ridge formed by the activated actuators 802-1 acts as the active airflow channel 803 as it follows behind the propeller 811 collecting at least some of the shed airflow structures. By forming an active airflow channel 803 in the form of a single ridge that follows behind the blade tip of the propeller 811 and spirals away from the propeller and out the exit of the duct, at least some of the airflow structures shed off the propeller blade are collected by the following ridge of the active airflow channel and channeled away from the following blade of the propeller, thereby reducing BAI and the sound generated from BAI. In other implementations, the active airflow channel may have other configurations.

Figure 8B:
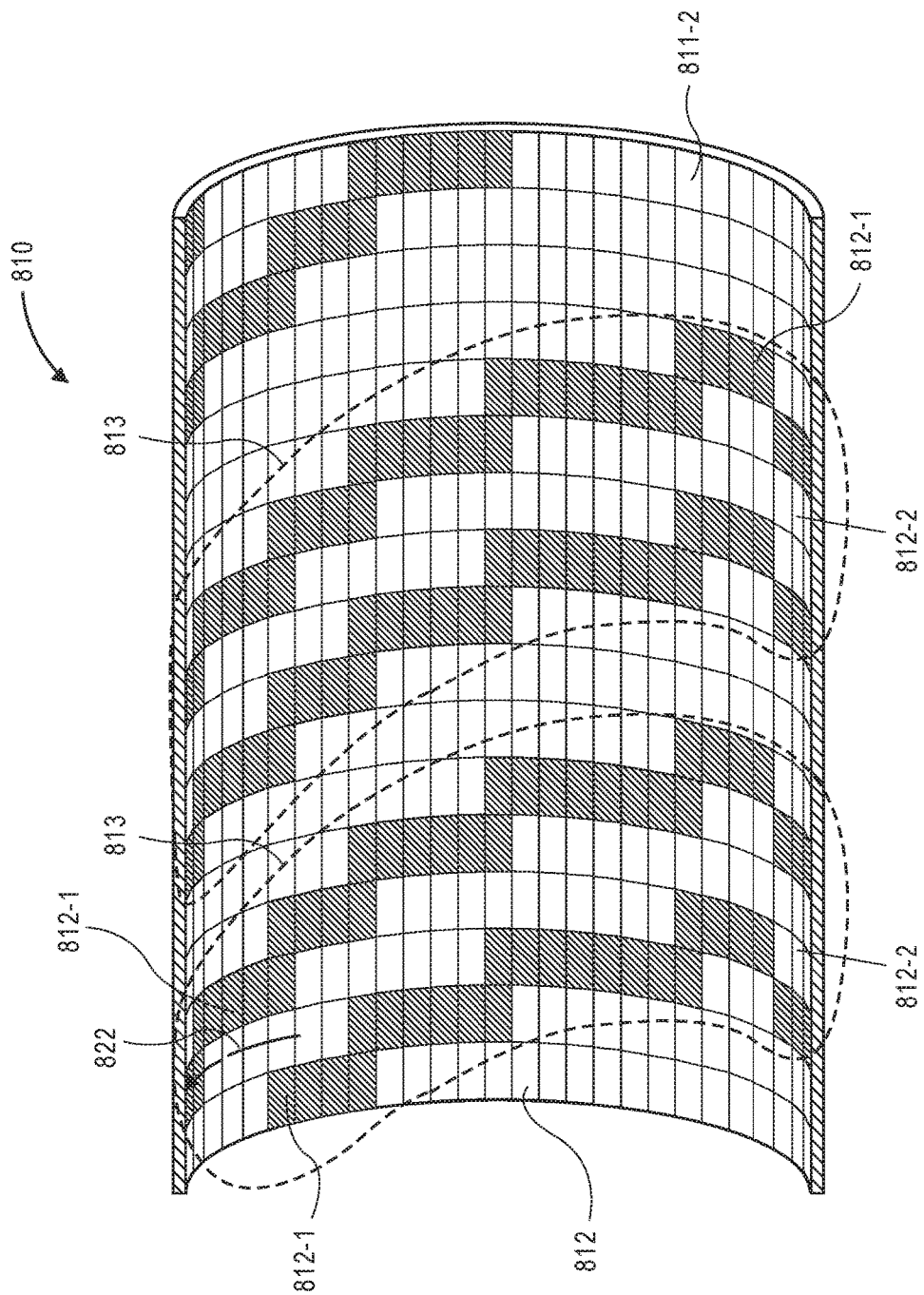

For example, FIG. 8B depicts a diagram of a cutout side-view of a duct 810 showing the inner surface area 811-2 in which the active airflow channels 813 are formed, according to an implementation. In this example, there are a plurality of actuators 812 positioned to form the interior surface area 811-2 of the duct 810 and the hatched or grey-colored actuators 812-1 have been activated to form a ridge on either side of the propeller 822. The two ridges formed by the activated actuators 812-1 function as the sides of the active airflow channel 813 and spiral away from the propeller 822. The actuators 812-2 between the two ridges, which are not activated, form the base or floor of the active airflow channel 813. As the propeller 822 rotates, the position of the active airflow channel is continually updated so it remains aligned with the blade tip of the propeller 822. As discussed above, as airflow structures are shed from the blade of the propeller 822, at least some of those shed airflow structures are collected in the active airflow channel 813 and channeled away from the propeller so that a following blade of the propeller 822 does not pass through the airflow structures. This reduces BAI and the sound generated by BAI.

Figure 8C:
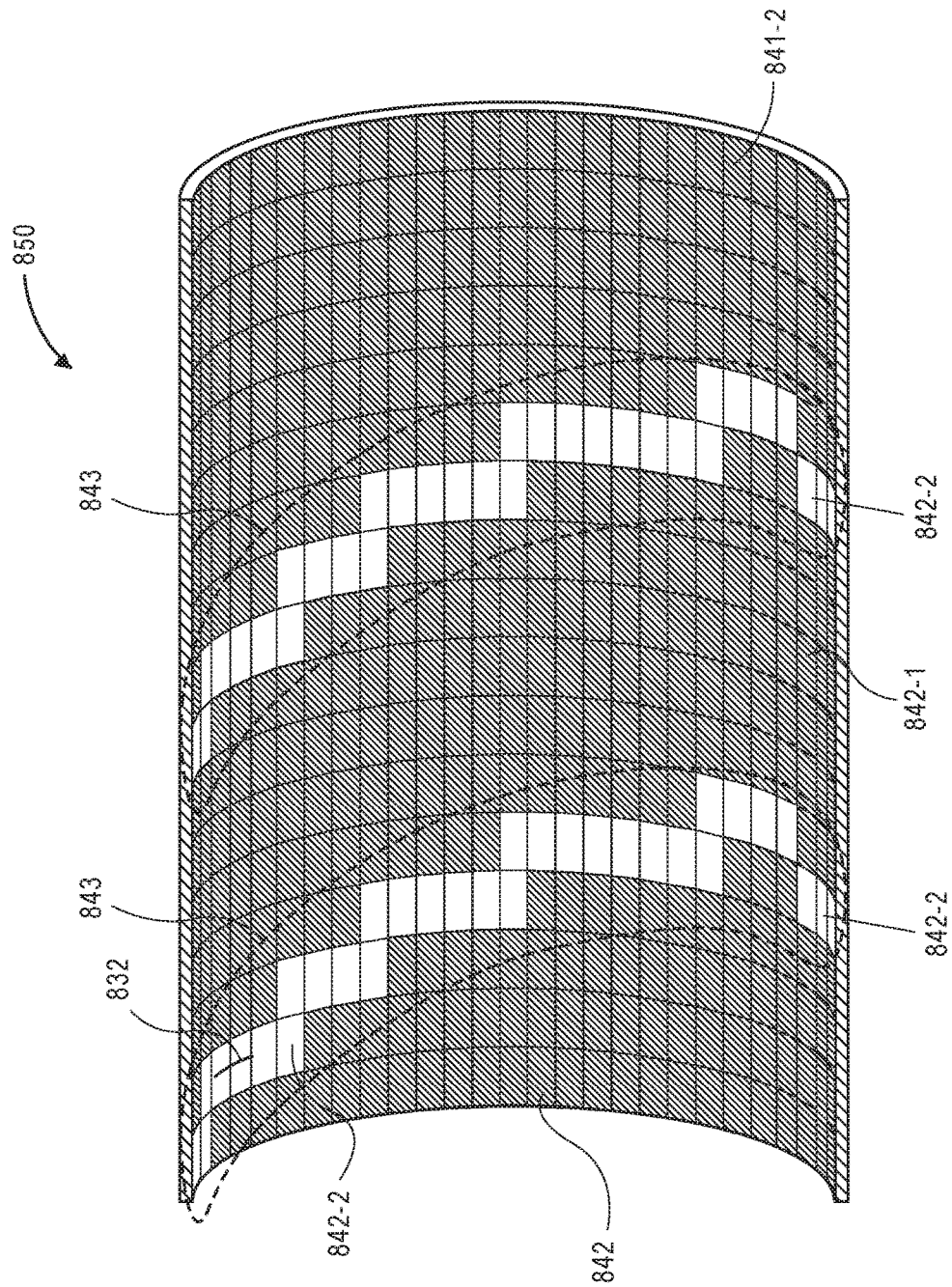

FIG. 8C depicts a diagram of a cutout side-view of a duct 850 showing the inner surface area 841-2 in which the active airflow channels 843 are formed, according to an implementation. In this example, there are a plurality of actuators 842 positioned to form the interior surface area 841-2 of the duct 850 and the hatched or grey colored actuators 842-1 have been activated and protrude toward a central portion of the duct 800. The actuators 842-2 have been deactivated to form a valley around the blade tip of the propeller 832 that spirals away from the propeller 832. In this example, rather than activating actuators to form ridges that function as the walls of an active airflow channel, the default position for the actuators in the duct 850 is in the protruded position and the active airflow channel controller sends instructions to the actuators 842-2 to deactivate, thereby forming a valley in the actuated actuators 842 that functions as the active airflow channel.

As the propeller 832 rotates, the position of the active airflow channel is continually updated so it remains aligned with the blade tip of the propeller 832. As discussed above, as airflow structures are shed from the blade of the propeller 832, at least some of the shed airflow structures are collected in the active airflow channel 843 and channeled away from the propeller blade so that a following blade of the propeller 832 does not pass through the collected airflow structures. This reduces BAI and the sound generated by BAI.

Figure 8D:
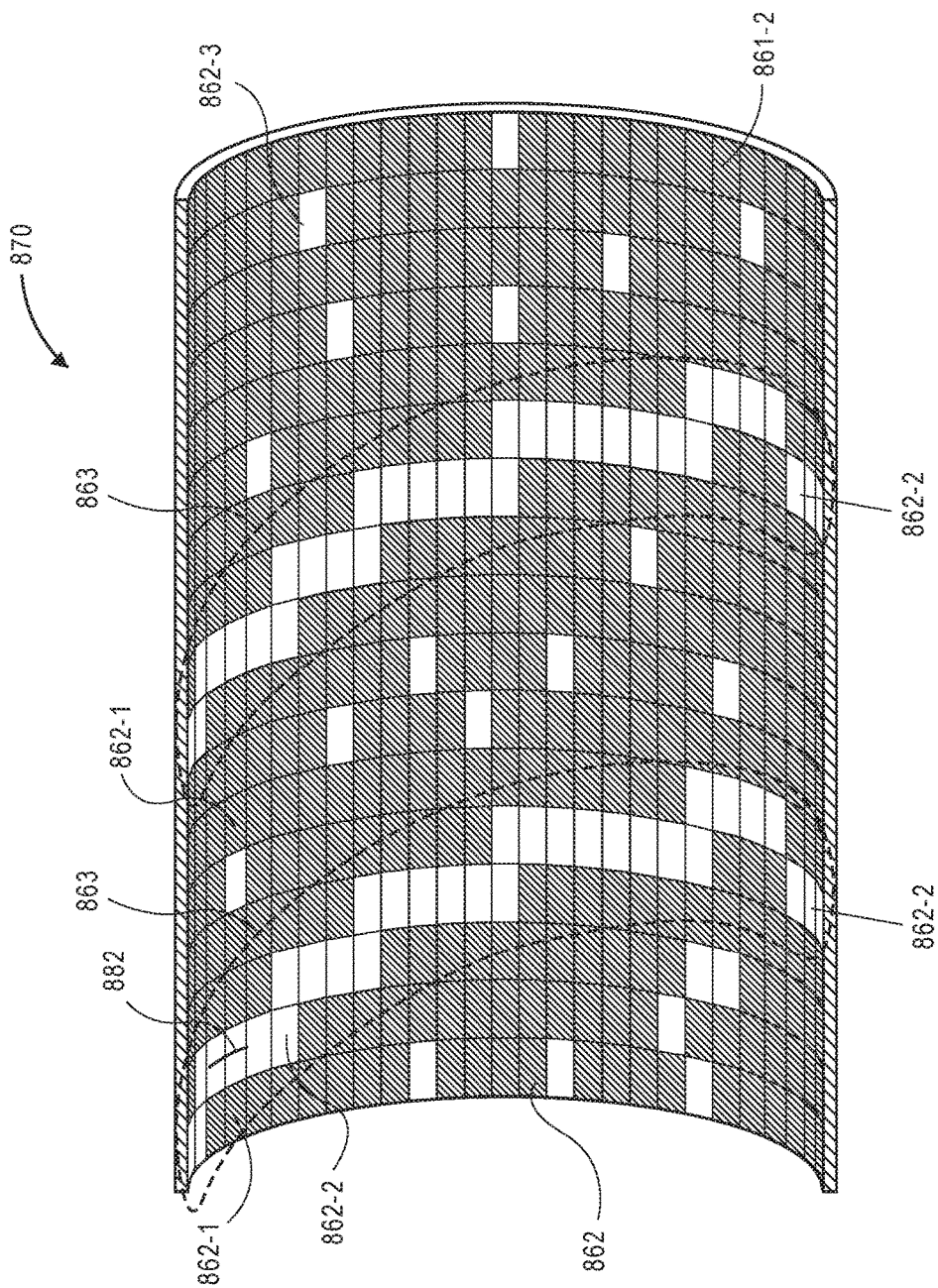

FIG. 8D depicts a diagram of a cutout side-view of a duct 870 showing the inner surface area 861-2 in which the active airflow channels 863 are formed, according to an implementation. Similar to FIG. 8C, in this example, there are a plurality of actuators 862 positioned to form the interior surface area 861-2 of the duct 870 and the hatched or grey colored actuators 862-1 have been activated, protruding toward a central portion of the duct 870. The actuators 862-2 have been deactivated and are substantially in-line with the interior surface area of the duct 870 and form a valley around the blade tip of the propeller 882 that spirals away from the propeller 882. In addition, other actuators 862-3 that are not being used to form the active airflow channel 863 may be randomly deactivated to form alterations or indentations in the contour of the interior surface area 861-2 of the duct. The indentations 862-3 create additional turbulence as the airflow through the duct passes over the indentations. The turbulence reduces resonant frequencies and effectively creates a broadband sound that is similar to white noise. The broadband sound may further reduce, or otherwise mask, the sounds generated by the aerial vehicle.

As the propeller 882 rotates, the position of the active airflow channel is continually updated so it remains aligned with the blade tip of the propeller 882. Likewise, different actuators 862-3 that are not being used to form the active airflow channel 863 may randomly activate or deactivate causing the contour of the interior surface area 861-2 of the duct 870 to continually change. As discussed above, as airflow structures are shed from the blade of the propeller 882, at least some of the airflow structures are collected in the active airflow channel 863 and channeled away from the blade of the propeller 882 so that a following blade of the propeller 882 does not pass through the collected airflow structures. This reduces BAI and the sound generated by BAI. Likewise, the changing contour of the other portions of the interior surface area 861-2 of the duct causes turbulence in the airflow passing through the duct that is not collected in the active airflow channel, thereby generating a broadband sound similar to white noise.

While the examples illustrated in FIGS. 8A-8D illustrate the actuators as having a rectangular shape and positioned in a grid pattern, in other implementations, the actuators may have other shapes and/or be positioned differently along the interior surface area of the duct. For example, the actuators may be substantially circular in shape and randomly positioned along the interior surface area of the duct. In some implementations, the entire interior surface area of the duct may not be formed by actuators but may be a stationary material upon which the actuators are affixed.

Figure 9:
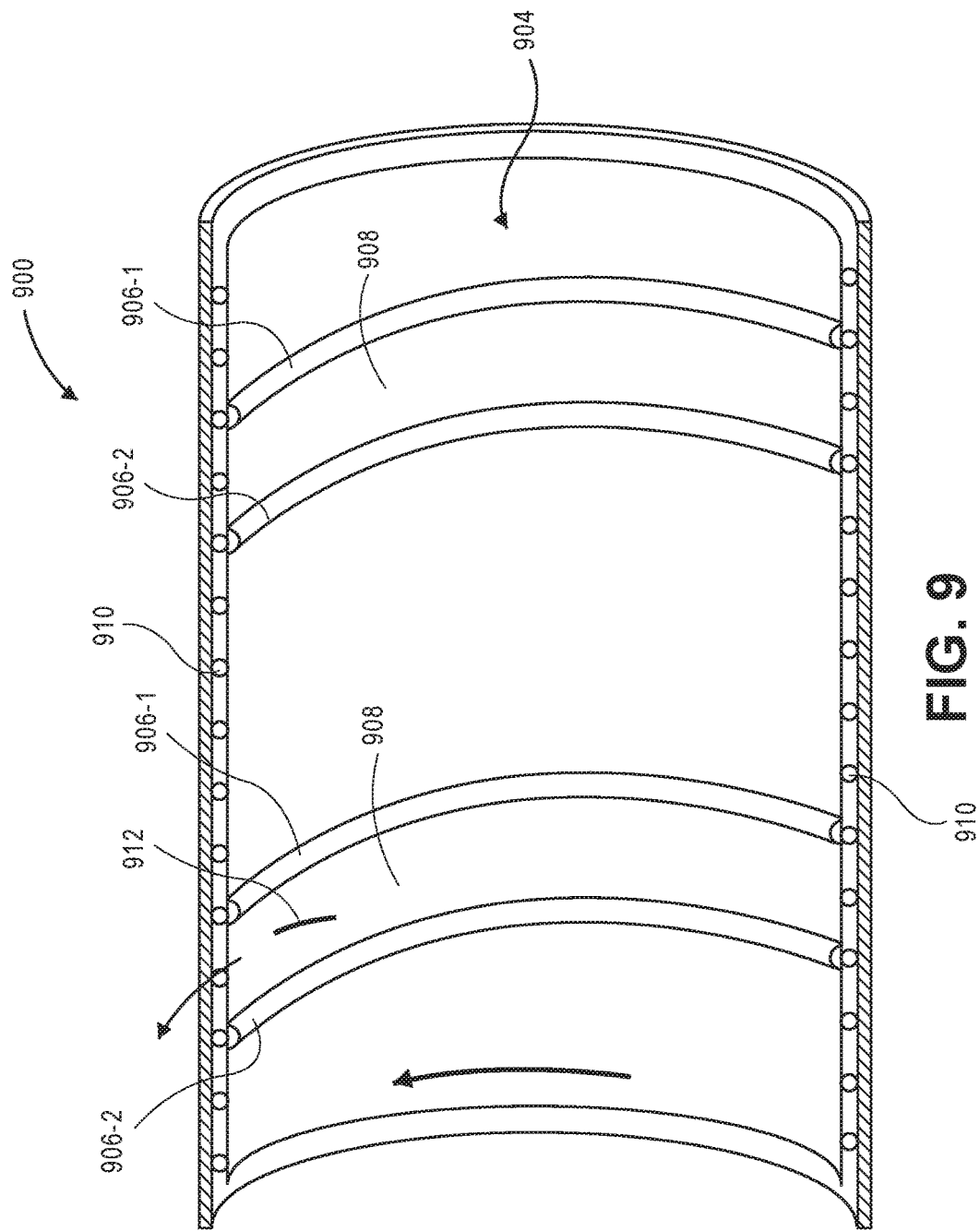

FIG. 9 depicts a diagram of a cutout side-view of a duct 900 showing the inner surface area with active airflow channels 908, according to an implementation. In this example, a rotating drum 904 is positioned within the inner surface area of the duct 900 that rotates within the duct at a speed consistent with the rotation of the propeller 912. The drum 904 includes active airflow channels 908 that are aligned with the propeller 912. The drum is rotated on a plurality of bearings 910 so that the active airflow channel remains positioned with the tip of the blade of the propeller 912. The ridges 906-1, 906-2 that are coupled to the drum and form the walls or edges of the active airflow channel are positioned on either side of the propeller 912. As the propeller rotates, the drum 904 rotates and at least some of the airflow structures shed from the blade of the propeller 912 are collected in the active airflow channel 908 and channeled away from the propeller so that a following propeller blade of the propeller 912 does not pass through the collected airflow structures. As discussed above, by channeling collected airflow structures away from the propeller so that a following propeller blade does not pass through the collected airflow structures reduces BAI and, thus, the sound resulting from BAI.

The ridges 906-1, 906-2 may be affixed to the drum 904 and protrude a defined distance toward a central area of the duct 900. The protrusion may be any defined amount, from just a few micrometers to several millimeters. In some implementations, the ridges 906-1, 906-2 may be affixed parallel to one another and in a spiral shape that initiates near the tip of the propeller 912 and spirals around the interior of the drum 904 and out the exit of the drum 904 and the exit of the duct 900. In other implementations, the ridges may be positioned elsewhere on the interior of the drum and/or may vary in height. For example, the ridges 906-1, 906-2 may protrude further into the central portion of the duct 900 closer to the propeller blade and then taper to less of a protrusion toward the exit of the duct 900. Likewise, rather than being parallel, the distance between the ridges 906-1, 906-2 may vary within the drum 904.

The speed of rotation of the drum 904 may be controlled by the active airflow channel controller in a manner similar to that discussed above. For example, a position of the tips of the blades of a propeller 912 within the duct 900 may be known and the propeller revolutions per minute (RPM) may be determined based on the commanded speed of the motor that is rotating the propeller. Utilizing this information, and a known diameter of the interior of the drum 904, an RPM for the drum 904 is determined. The RPMs for the drum 904 is sent to one or more rotation controllers and motors that cause the drum to rotate within the duct 900. For example, the rotation controllers and motors may be positioned between the exterior of the drum 904 and the interior surface area of the duct and drive the rotation of the drum. If the RPMs of the propeller change, updated RPMs for the drum 904 are determined and the rotation speed of the drum 904 is adjusted as the speed of the propeller 912 changes. In other implementations, the rotation of the drum may be controlled directly by the motor that rotates the propeller within the duct 900. For example, the propeller motor may include a gear or pulley system that causes the drum 904 to rotate when the motor rotates. The gears or pulleys may be configured so that the RPMs of the drum corresponds to the RPMs of the propeller in such a manner that the active airflow channel formed on the interior of the duct remains aligned with the blades of the propeller.

As will be appreciated, any variety of actuators, rotating members, drums, etc., may be used to alter the surface area of the interior of ducts positioned around propeller blades to channel shed airflow structures away from the propeller. In addition to channeling shed airflow structures away from the propeller, the active airflow channels may also alter the airflow around the propeller blade in other ways. For example, the lift created by the pressure differential between the air above the propeller blades and below the propeller blades may be altered by forming active airflow channels along the interior of the duct.

Figure 10:
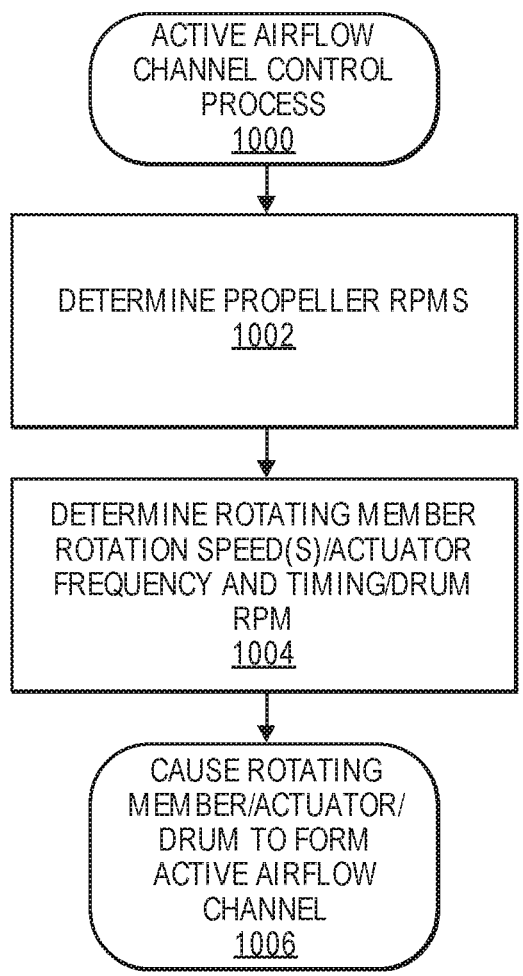
FIG. 10 is a flow diagram of an example active airflow channel control process, according to an implementation.

FIG. 10 is a flow diagram of an example active airflow channel control process 1000, according to an implementation. The process 1000 is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 1000 may be operational while an aerial vehicle is powered. The example process 1000 begins by determining commanded propeller RPMs of a ducted propeller for which an active airflow channel is to be formed for each of the propeller blades of the propeller, as in 1002. Likewise, the position of the tip of each propeller blade of the propeller within the duct may be known or determined. The propeller RPMs may be determined, for example based on the instructions sent from the aerial vehicle control system (discussed below with respect to FIG. 11) to the controllers that control the rotational speed of the motor that causes rotation of the propeller positioned within the duct.

In implementations that utilize a plurality of rotating members (FIGS. 4-7) with affixed paddles positioned along or forming the interior surface area of the duct, the rotational speed or RPMs of the rotating members is determined such that the active airflow channel formed by the paddles that are affixed to the rotating members remains aligned with the tips of each blade of the propeller within the duct, as in 1004. As discussed above, the rotation of the rotating members may be controlled by a rotation controller and motor. In other implementations, the rotating members may be driven by the rotation of the motor that rotates the propeller within the duct. In such an example, the example process 1000 may not need to be performed because the rotating members may be directly controlled by the rotation of the propeller motor and thus the rotational speed of the rotating members always corresponds with the rotational speed of the propeller.

In examples that utilize actuators (FIGS. 8A-8D) positioned on or forming the interior surface area of the duct, an actuator frequency and initialization time may be determined for each of the actuators, as in 1004. The actuator frequency and initialization time may be determined such that, when activated, the actuators will form the active airflow channel within the interior surface area of the duct, as discussed above.

Finally, in examples that utilize a drum (FIG. 9), the rotational speed of the drum is determined that will cause the active airflow channel on the interior of the drum to remain aligned with the rotation of the propeller, as in 1004. As discussed above, in some implementations, the rotational speed of the drum may be controlled by a rotation controller and motor. In other implementations, the rotation of the drum may be driven by the rotation of the motor that rotates the propeller within the duct. In such an example, the example process 1000 may not need to be performed because the rotational speed of the drum is controlled by the same motor that controls the rotation of the propeller.

Upon determining the rotation speed for the rotating members (if needed), the actuator frequency and timing for the actuators, or determining the RPMs for the drum, instructions are sent that cause the rotating members, actuators, or drum. The instructions cause the rotating members, actuators, or drum to form an active airflow channel that remains aligned with the position of the blades of the propeller so that the active airflow channel collects at least some of the airflow structures shed from the blades of the propeller and channels the collected airflow structures away from the propeller, as in 1006.

The example process 1000 may continue during operation of the aerial vehicle, continually updating the function of the rotating members, actuators or drum so that the formed active airflow channel remains aligned with the tips of the blades of the propeller even if the RPM of the propeller changes.

Figure 11:
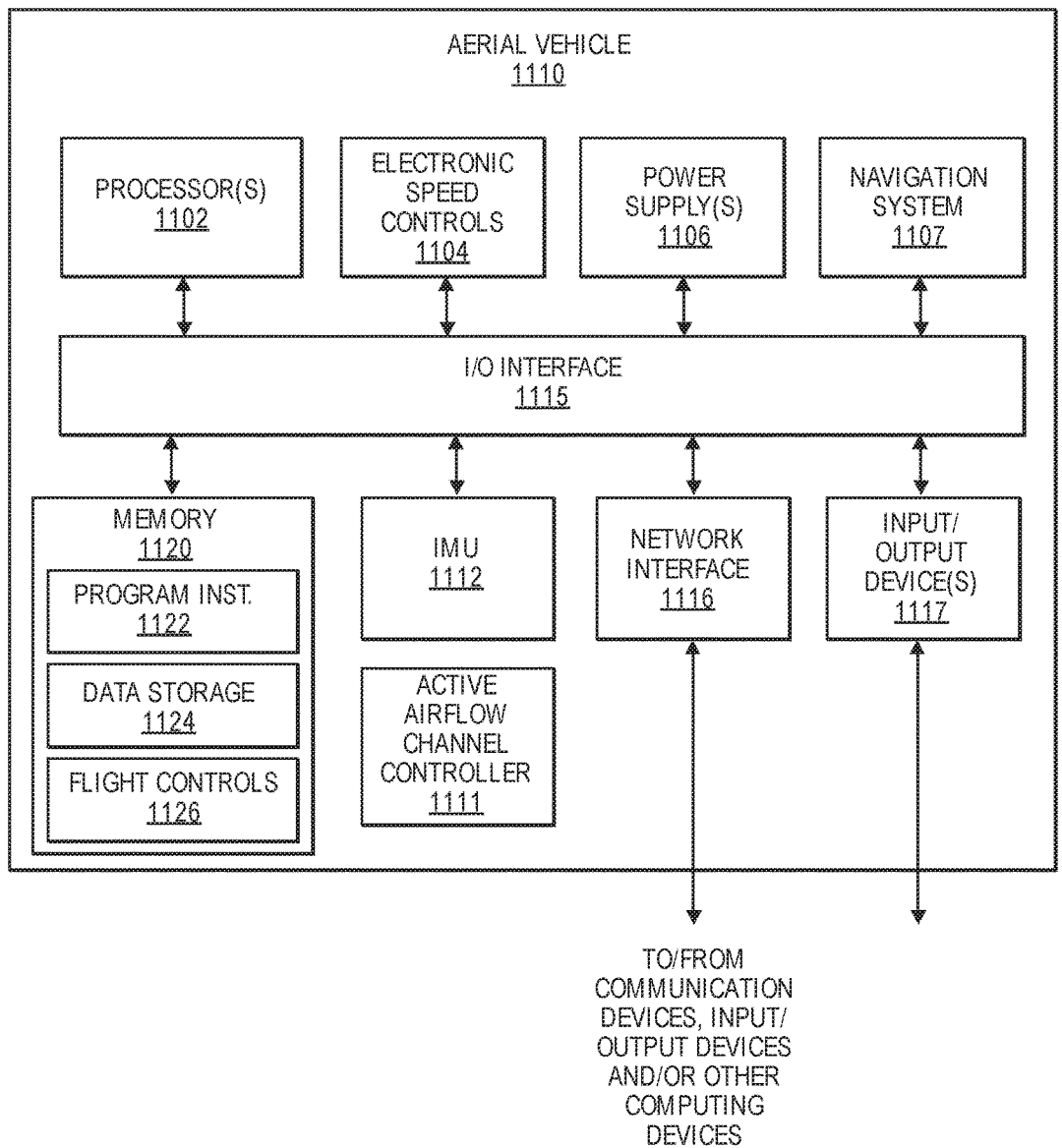
FIG. 11 is a block diagram of an illustrative implementation of an unmanned aerial vehicle control system, according to an implementation.

FIG. 11 is a block diagram illustrating an example aerial vehicle control system 1110. In various examples, the block diagram may be illustrative of one or more aspects of the aerial vehicle control system 1110 that may be used to implement the various systems and methods discussed herein and/or to control operation of the aerial vehicles described herein. In the illustrated implementation, the aerial vehicle control system 1110 includes one or more processors 1102, coupled to a memory, e.g., a non-transitory computer readable storage medium 1120, via an input/output (I/O)

interface 1115. The aerial vehicle control system 1110 may also include electronic speed controls 1104 (ESCs), power supply modules 1106, a navigation system 1107, and/or an inertial measurement unit (IMU) 1112. In some implementations, the IMU may be incorporated into the navigation system 1107. The aerial vehicle control system 1110 may also include a payload engagement controller (not shown), a network interface 1116, one or more input/output devices 1117, and an active airflow channel controller 1111.

In various implementations, the aerial vehicle control system 1110 may be a uniprocessor system including one processor 1102, or a multiprocessor system including several processors 1102 (e.g., two, four, eight, or another suitable number). The processor(s) 1102 may be any suitable processor capable of executing instructions. For example, in various implementations, the processor(s) 1102 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1102 may commonly, but not necessarily, implement the same ISA.

The non-transitory computer readable storage medium 1120 may be configured to store executable instructions, data, flight paths, flight control parameters, component adjustment information, center of gravity information, propeller dimensions, duct dimensions, actuator positions/addresses within an interior surface area of the duct, propeller positions, and/or data items accessible by the processor(s) 1102. In various implementations, the non-transitory computer readable storage medium 1120 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1120 as program instructions 1122, data storage 1124 and flight controls 1126, respectively. In other implementations, program instructions, data, and/or flight controls may be received, sent, or stored upon different types of computer-accessible media, such as non-transitory media, or on similar media separate from the non-transitory computer readable storage medium 1120 or the aerial vehicle control system 1110. Generally speaking, a non-transitory, computer readable storage medium may include storage media or memory media such as magnetic or optical media, e.g., disk or CD/DVD-ROM, coupled to the aerial vehicle control system 1110 via the I/O interface 1115. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1116.

In one implementation, the I/O interface 1115 may be configured to coordinate I/O traffic between the processor(s) 1102, the non-transitory computer readable storage medium 1120, and any peripheral devices, the network interface or other peripheral interfaces, such as input/output devices 1117, the ESCs 1104, and/or the active airflow channel controller 1111. In some implementations, the I/O interface 1115 may perform any necessary protocol, timing or other data transformations to convert data signals from one component (e.g., non-transitory computer readable storage medium 1120) into a format suitable for use by another component (e.g., processor(s) 1102). In some implementations, the I/O interface 1115 may include support for devices attached through various types of peripheral buses, such as a variant of the Peripheral Component Interconnect (PCI) bus standard or the Universal Serial Bus (USB) standard, for example. In some implementations, the function of the I/O interface 1115 may be split into two or more separate components, such as a north bridge and a south bridge, for example. Also, in some implementations, some or all of the functionality of the I/O interface 1115, such as an interface to the non-transitory computer readable storage medium 1120, may be incorporated directly into the processor(s) 1102.

The ESCs 1104 communicate with the navigation system 1107, the active airflow channel controller 1111, and/or the IMU 1112 and adjust the rotational speed of each lifting motor and/or the thrusting motor to stabilize the aerial vehicle and guide the aerial vehicle along a determined flight path. The navigation system 1107 may include a GPS, indoor positioning system (IPS), IMU or other similar system and/or sensors that can be used to navigate the aerial vehicle to and/or from a location. The active airflow channel controller receives the instructions for the rotational speed of the motors and determines the rotation speed or instructions to cause the active airflow channels to be formed within the ducts that surround the motor so that the active airflow channel remains aligned with the tips of the blades of the propeller. The payload engagement controller communicates with the actuator(s) or motor(s) (e.g., a servo motor) used to engage and/or disengage items.

The network interface 1116 may be configured to allow data to be exchanged between the aerial vehicle control system 1110, other devices attached to a network, such as other computer systems (e.g., remote computing resources), and/or with aerial vehicle control systems of other aerial vehicles. For example, the network interface 1116 may enable wireless communication between the aerial vehicle that includes the control system 1110 and an aerial vehicle control system that is implemented on one or more remote computing resources. For wireless communication, an antenna of an aerial vehicle or other communication components may be utilized. As another example, the network interface 1116 may enable wireless communication between numerous aerial vehicles. In various implementations, the network interface 1116 may support communication via wireless general data networks, such as a Wi-Fi network. For example, the network interface 1116 may support communication via telecommunications networks, such as cellular communication networks, satellite networks, and the like.

Input/output devices 1117 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 1117 may be present and controlled by the aerial vehicle control system 1110. One or more of these sensors may be utilized to assist in landing as well as to avoid obstacles during flight.

As shown in FIG. 11, the memory may include program instructions 1122, which may be configured to implement the example routines and/or sub-routines described herein. The data storage 1124 may include various data stores for maintaining data items that may be provided for determining flight paths, landing, identifying locations for disengaging items, engaging/disengaging the pushing motors, propeller positions within ducts, duct diameters, actuator addresses or identifiers, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1110 is merely illustrative and is not intended to limit the scope of the present disclosure. In particular, the computing system and devices may include any combination of hardware or software that can perform the indicated functions. The aerial vehicle control system 1110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1110. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1110 may be transmitted to the aerial vehicle control system 1110 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus, comprising:
    a motor;
    a propeller having a first diameter, the propeller coupled to the motor and rotatable by the motor;
    a duct encompassing the motor and the propeller, the duct having an inner surface having a second diameter that is greater than the first diameter so that the propeller can rotate within the duct without contacting the duct; and
    an airflow channel formed along the inner surface of the duct and configured to collect at least some airflow structures produced by the propeller and channel the at least some airflow structures away from the propeller, wherein a position of the airflow channel moves along the inner surface of the duct with rotation of the propeller.

2. The apparatus of claim 1, wherein the duct further includes:
    a plurality of rotating members positioned along the inner surface and rotatable to form the airflow channel.

3. The apparatus of claim 2, further comprising:
    a gear configured to cause rotation of at least some of the plurality of rotating members, wherein the gear is driven by the motor.

4. An aerial vehicle, comprising:
    a center mounted fuselage;
    a duct having a substantially circular shape and surrounding the center mounted fuselage;
    a motor coupled to the center mounted fuselage;
    a first propeller coupled to and rotatable in a first direction by the motor;
    a second propeller in alignment with the first propeller and rotatable in a second direction that is opposite the first direction;
    a front support arm coupling the center mounted fuselage to the duct;
    a rear support arm coupling the center mounted fuselage to the duct;
    an airflow channel formed along the inner surface of the duct and configured to collect at least some airflow structures produced by the propeller and channel the at least some airflow structures away from the first propeller or the second propeller, wherein a position of the airflow channel moves along the inner surface of the duct with rotation of at least one of the first propeller or the second propeller.

5. The aerial vehicle of claim 4, wherein the duct has an airfoil shape and provides lift to the aerial vehicle when the aerial vehicle is navigating in a direction that includes a horizontal component.

6. The aerial vehicle of claim 4, wherein the airflow channel includes a ridge positioned to collect the at least some airflow structure produced by the first propeller or the second propeller and channel the at least some airflow structure away from the first propeller and the second propeller.

7. The aerial vehicle of claim 4, further comprising:
    a plurality of actuators on an inner surface area of the duct and operable to form an airflow channel along the inner surface area of the duct to channel airflow structure out of the duct.

8. The aerial vehicle of claim 7, further comprising:
    an airflow controller configured to control an operation of each of the plurality of actuators.

9. The aerial vehicle of claim 7, wherein a first actuator of the plurality of actuators is a hinged actuator that is affixed to the inner surface area and configured to move about a hinge between a first position that protrudes into a central portion of the duct to form a portion of the airflow channel and a second position.

10. The aerial vehicle of claim 7, wherein a first actuator of the plurality of actuators includes a piezoelectric actuator that when activated causes the first actuator to protrude into a central portion of the duct.

11. The aerial vehicle of claim 7, wherein a first actuator of the plurality of actuators includes a solenoid that when activated causes the first actuator to protrude into a central portion of the duct.

12. The aerial vehicle of claim 7, wherein a first actuator of the plurality of actuators includes pneumatics that when activated cause the first actuator to protrude into a central portion of the duct.

13. A duct apparatus, comprising:
- an inner surface area having a length, a first diameter, and a substantially cylindrical shape;
- an exterior surface area having the length, a second diameter that is larger than the first diameter, and the substantially cylindrical shape;
- an active airflow channel positioned along the inner surface area, the active airflow channel configured to channel airflow structures generated from a rotation of a propeller encompassed by the duct apparatus away from the propeller; and
- an active airflow channel controller operable to control a position of the active airflow channel along the inner surface area.

14. The duct apparatus of claim 13, wherein:
- the active airflow channel includes a plurality of actuators positioned along the inner surface area; and
- the active airflow channel controller is operable to send an instruction to each of the plurality of actuators to control a position of each of the actuators.

15. The duct apparatus of claim 14, wherein:
- each actuator of the plurality of actuators is operable to move between a retracted position and an extended position in which the actuator protrudes from the inner surface area of the duct apparatus.

16. The duct apparatus of claim 13, wherein the active airflow channel controller sends instructions to produce at least one of a random pattern along an inner surface area of the duct apparatus or a channel along at least a portion of the inner surface area of the duct apparatus.

17. The duct apparatus of claim 13, wherein a diameter of the duct apparatus changes along the length of the duct.

* * * * *